(12) United States Patent
Naito

(10) Patent No.: US 9,657,460 B2
(45) Date of Patent: May 23, 2017

(54) WHEEL LOADER

(71) Applicant: KOMATSU LTD., Tokyo (JP)

(72) Inventor: Makoto Naito, Komatsu (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/902,917

(22) PCT Filed: Jun. 3, 2014

(86) PCT No.: PCT/JP2014/064753
§ 371 (c)(1),
(2) Date: Jan. 5, 2016

(87) PCT Pub. No.: WO2015/019694
PCT Pub. Date: Feb. 12, 2015

(65) Prior Publication Data
US 2016/0153174 A1    Jun. 2, 2016

(30) Foreign Application Priority Data

Aug. 8, 2013 (JP) .................................. 2013-165004
Dec. 10, 2013 (JP) .................................. 2013-254750

(51) Int. Cl.
*B60K 6/405* (2007.10)
*E02F 9/20* (2006.01)
(Continued)

(52) U.S. Cl.
CPC .............. *E02F 9/202* (2013.01); *B60K 6/365* (2013.01); *B60K 6/387* (2013.01); *B60K 6/40* (2013.01);
(Continued)

(58) Field of Classification Search
CPC ........ E02F 9/202; E02F 9/2075; F16H 3/725; F16H 57/02; B60W 6/405
See application file for complete search history.

(56) References Cited

U.S. PATENT DOCUMENTS

2002/0036106 A1*  3/2002  Hanyu .................... B60K 6/24
                                                      180/65.235
2006/0217225 A1   9/2006  Hiraki et al.
(Continued)

FOREIGN PATENT DOCUMENTS

GB    2 177 168 A     1/1987
JP    2000-18367 A    1/2000
(Continued)

OTHER PUBLICATIONS

The International Search Report for the corresponding international application No. PCT/JP2014/064753, issued on Aug. 19, 2014.
(Continued)

*Primary Examiner* — Huan Le
(74) *Attorney, Agent, or Firm* — Global IP Counselors, LLP

(57) ABSTRACT

A transmission of a wheel loader is configured so that a rotation speed ratio of an output shaft with respect to an input shaft is changed by changing the rotation speeds of a first motor and a second motor. A transmission case has an input shaft case for containing the input shaft. A lower part of the input shaft case includes a curved surface part. The curved surface part is curved to protrude downwards. The first motor and the second motor are arranged below the input shaft. At least a portion of each of the first motor and the second motor overlaps the curved surface part in a projection view in the up-down direction.

23 Claims, 15 Drawing Sheets

(51) Int. Cl.

| | |
|---|---|
| *B60K 6/40* | (2007.10) |
| *B60K 17/04* | (2006.01) |
| *B60K 17/06* | (2006.01) |
| *B60K 6/365* | (2007.10) |
| *B60K 6/387* | (2007.10) |
| *B60K 6/445* | (2007.10) |
| *E02F 9/08* | (2006.01) |
| *E02F 3/28* | (2006.01) |
| *E02F 9/02* | (2006.01) |
| *E02F 9/16* | (2006.01) |
| *F16H 3/72* | (2006.01) |
| *F16H 57/02* | (2012.01) |
| *F16H 61/02* | (2006.01) |
| *B60K 6/38* | (2007.10) |

(52) U.S. Cl.
CPC ............. *B60K 6/405* (2013.01); *B60K 6/445* (2013.01); *B60K 17/04* (2013.01); *B60K 17/06* (2013.01); *E02F 3/283* (2013.01); *E02F 9/02* (2013.01); *E02F 9/0866* (2013.01); *E02F 9/0883* (2013.01); *E02F 9/16* (2013.01); *E02F 9/2075* (2013.01); *F16H 3/725* (2013.01); *F16H 57/02* (2013.01); *F16H 61/0267* (2013.01); *B60K 2006/381* (2013.01); *B60Y 2200/41* (2013.01); *B60Y 2200/415* (2013.01); *B60Y 2200/92* (2013.01); *B60Y 2400/73* (2013.01); *Y02T 10/6239* (2013.01); *Y10S 903/91* (2013.01); *Y10S 903/919* (2013.01)

(56) References Cited

U.S. PATENT DOCUMENTS

| | | | |
|---|---|---|---|
| 2009/0105028 A1 | 4/2009 | Hiraki et al. | |
| 2009/0267352 A1* | 10/2009 | Sada ..................... | B60K 6/365 290/1 A |
| 2011/0039649 A1* | 2/2011 | Tanae ..................... | B60K 6/365 475/5 |
| 2011/0042155 A1* | 2/2011 | Tarasinski .............. | B60K 6/365 180/65.6 |
| 2013/0184111 A1* | 7/2013 | Tsuchida .................. | B60K 6/40 475/5 |

FOREIGN PATENT DOCUMENTS

| | | |
|---|---|---|
| JP | 2005-344890 A | 12/2005 |
| JP | 2006-329244 A | 7/2006 |
| JP | 2009-143562 A | 7/2009 |
| JP | 2010-856 A | 1/2010 |
| WO | 2004/104449 A1 | 12/2004 |

OTHER PUBLICATIONS

The extended European search report for the corresponding European application No. 14833861.9, issued on Mar. 17, 2017.

* cited by examiner

| MODE | Lo | | Hi | |
|---|---|---|---|---|
| | L1 | L2 | H1 | H2 |
| MOTOR/GENERATOR MG1 | M | M | G | G |
| MOTOR/GENERATOR MG2 | G | G | M | M |
| MOTOR/GENERATOR MG3 | M | G | M | G |
| CLUTCH CL | O | O | X | X |
| CLUTCH CH | X | X | O | O |
| CLUTCH Cm1 | O | X | X | O |
| CLUTCH Cm2 | X | O | O | X |

WHEEL LOADER

CROSS-REFERENCE TO RELATED APPLICATIONS

This application is a U.S. National stage application of International Application No. PCT/JP2014/064753, filed on Jun. 3, 2014. This U.S. National stage application claims priority under 35 U.S.C. §119(a) to Japanese Patent Application No. 2013-165004, filed in Japan on Aug. 8, 2013, and to Japanese Patent Application No. 2013-254750, filed in Japan on Dec. 10, 2013, the entire contents of which are hereby incorporated herein by reference.

BACKGROUND

Field of the Invention

The present invention relates to a hybrid-type wheel loader.

Background Information

Recently, a hybrid-type wheel loader has been proposed that travels using driving power from an engine and driving power from a motor. A hydraulic-mechanical transmission (HMT) or an electric-mechanical transmission (EMT) is disclosed as a transmission for a hybrid-type wheel loader as in, for example, Japanese Unexamined Patent Application Publication No. 2006-329244.

The HMT has a planetary gear mechanism, and at least two hydraulic motors connected to a rotating element of the planetary gear mechanism. The hydraulic motor functions as either a motor or a pump in response to the travel state of the wheel loader. The HMT is configured to enable stepless changing of the rotation speed of the output shaft by changing the rotation speed of the hydraulic motor.

An electric motor is used in the EMT in place of the hydraulic motor in the HMT. The electric motor functions as either a motor or a generator in response to the travel state of the wheel loader. Similar to the HMT, the EMT is configured to enable stepless changing of the rotation speed of the output shaft by changing the rotation speed of the electric motor.

SUMMARY

The transmission of the above-mentioned hybrid-type wheel loader has a motor and the motor is attached to the transmission case. When the motor is arranged beside a transmission case, the motor protrudes laterally from the transmission case. In this case, the size of the entire transmission is increased in the vehicle width direction in comparison to a conventional transmission not equipped with a motor. When the size of the entire transmission is increased in the vehicle width direction, problems arise, such as the vehicle body of the wheel loader becoming larger or the turning performance being reduced due to a greater distance between the tires.

An object of the present invention is to suppress an increase in the size of the transmission in the vehicle width direction in a hybrid-type wheel loader.

A wheel loader according to a first aspect of the present invention is provided with an engine, a travel device, a transmission, and a vehicle body frame. The travel device is driven by the engine. The transmission transmits driving power from the engine to the travel device. The vehicle body frame supports the transmission. The transmission has an input shaft extending in the vehicle front-back direction, an output shaft extending in the vehicle front-back direction, a gear mechanism, a transmission case, a first motor, and a second motor. The gear mechanism includes a middle shaft that is arranged under the input shaft and extends in the vehicle front-back direction, and a planetary gear mechanism connected to the middle shaft. The gear mechanism transmits the rotation of the input shaft to the output shaft. The first motor is connected to a first rotating element of the planetary gear mechanism and is attached to the transmission case. The second motor is connected to a second rotating element of the planetary gear mechanism and is attached to the transmission case. The transmission is configured so that a rotation speed ratio of the output shaft with respect to the input shaft is changed by changing the rotation speeds of the first motor and the second motor. The transmission case has an input shaft case for housing the input shaft. A lower part of the input shaft case includes a curved surface part. The curved surface part is curved to protrude downwards. The first motor and the second motor are arranged below the input shaft. At least a portion of each of the first motor and the second motor overlaps the curved surface part as seen in a projection view in the up-down direction.

In this case, the first motor and the second motor are arranged so that at least a portion of each of the first motor and the second motor overlaps the curved surface part in a projection view in the up-down direction in a space under the input shaft case. As a result, the amount of protrusion in the vehicle width direction of the first motor and the second motor is reduced. Consequently, an increase in the size of the transmission in the vehicle width direction is suppressed. Moreover, the center of gravity of the transmission can be lowered due to the first motor and the second motor, which are heavy objects, being arranged in a low position.

The transmission case preferably further has a middle shaft case for housing the gear mechanism. The middle shaft case is arranged in line with the input shaft case in the vehicle front-back direction. The bottom part of the middle shaft case is positioned below the bottom part of the input shaft case. At least a portion of each of the first motor and the second motor overlaps the middle shaft case as seen in the vehicle front-back direction.

In this case, an interval in the vehicle width direction between the first motor and the second motor can be made smaller. Consequently, an increase in the size of the transmission in the vehicle width direction is suppressed.

The rotational axis of the first motor is preferably positioned below the bottom part of the input shaft case. In this case, the interval in the vehicle width direction between the first motor and the second motor can be made even smaller.

The rotational axis of the second motor is preferably positioned below the bottom part of the input shaft case. In this case, the interval in the vehicle width direction between the first motor and the second motor can be made even smaller.

The bottom part of the first motor is preferably positioned below the bottom part of the input shaft case. In this case, the interval in the vehicle width direction between the first motor and the second motor can be made even smaller.

The bottom part of the second motor is preferably positioned below the bottom part of the input shaft case. In this case, the interval in the vehicle width direction between the first motor and the second motor can be made even smaller.

An uppermost part of the first motor is preferably positioned above the bottom part of the input shaft case. In this case, the position of the first motor is suppressed from being arranged too low. Consequently, interference with components arranged under the first motor can be avoided.

An uppermost part of the second motor is preferably positioned above the bottom part of the input shaft case. In this case, the position of the second motor is suppressed from being arranged too low. Consequently, interference with components arranged under the second motor can be avoided.

The first motor and the second motor are preferably arranged with an interval in the vehicle width direction. The middle shaft is arranged between the first motor and the second motor. In this case, the first motor and the second motor can be arranged in a space under the input shaft case while avoiding the first motor and the second motor from interference with the middle shaft.

The transmission case preferably further has a protruding part that protrudes downward from the bottom part of the input shaft case. A portion of the middle shaft is arranged inside the protruding part. The protruding part is arranged between the first motor and the second motor. In this case, the first motor and the second motor can be arranged in a space under the input shaft case while avoiding the first motor and the second motor from interference with the protruding part.

The travel device preferably has an axle shaft that extends in the vehicle width direction, and a transmission shaft for transmitting driving power from the transmission to the axle shaft. At least a portion of the transmission shaft is arranged under the transmission and extends in the vehicle front-back direction. The first motor and the second motor are arranged obliquely upward the transmission shaft.

In this case, access to the first motor and the second motor can be facilitated without being hindered by the transmission shaft when carrying out maintenance on the first motor and the second motor.

The travel device preferably further has an axle housing for housing the axle shaft. The axle housing is supported in a swingable manner with respect to the vehicle body frame. The first motor and the second motor are arranged by being shifted with respect to the axle housing in the vehicle front-back direction. In this case, interference of the first motor and the second motor in the swinging range of the axle housing can be avoided while allowing the first motor and the second motor and the axle housing to be arranged in a compact manner.

The bottom part of the first motor is preferably arranged below the uppermost part of the axle housing. In this case, the first motor and the axle housing can be arranged in a compact manner in the up-down direction.

The bottom part of the second motor is preferably arranged below the uppermost part of the axle housing. In this case, the second motor and the axle housing can be arranged in a compact manner in the up-down direction.

The vehicle body frame preferably further has a mount bracket that supports the axle housing in a swingable manner. An upper surface of the mount bracket includes a recessed part that is recessed downwards. The first motor and the second motor are arranged to pass through the recessed part in the vehicle front-back direction. In this case, the first motor and the second motor can be arranged in a low position while avoiding the first motor and the second motor from interference with the mount bracket.

The bottom surface of the vehicle body frame preferably has an opening positioned under the transmission. In this case, access to the first motor and the second motor from below can be facilitated through the opening and maintenance performance can be improved.

The transmission preferably further has a third motor for assisting the first motor or the second motor. A rotational axis of the third motor is arranged above the rotational axis of the first motor and the rotational axis of the second motor. In this case, access to the third motor from above can be facilitated and maintenance performance can be improved.

The transmission preferably further has a first power take-off mechanism connected to the input shaft and a second power take-off mechanism connected to the input shaft. The first power take-off mechanism and the second power take-off mechanism are arranged over the first motor and the second motor. The third motor is arranged by being shifted in the vehicle front-back direction with respect to the first motor or the second motor. In this case, the third motor can be arranged in a compact manner while avoiding the third motor from interference with the first power take-off mechanism and the second power take-off mechanism.

An end of a rotating shaft of the first motor and an end of a rotating shaft of the second motor are oriented in a direction from the first motor and the second motor toward the third motor in the vehicle front-back direction. An end of a rotating shaft of the third motor is oriented in a direction from the third motor toward the first motor and the second motor in the vehicle front-back direction. In this case, the first motor and the second motor and the third motor can be arranged in a compact manner while avoiding the third motor from interference with the first motor and the second motor.

An operating cabin is preferably further provided by being attached to the vehicle body frame in a detachable manner. The third motor is positioned under the operating cabin. In this case, the third motor can be accessed from above by removing the operating cabin from the vehicle body frame. Accordingly, maintenance performance can be improved.

The third motor is preferably arranged beside of the transmission case. The transmission further has a hydraulic clutch for switching the power transmission path in the transmission, and a clutch control valve for controlling hydraulic fluid supplied to the hydraulic clutch. The clutch control valve is arranged on the front surface or the rear surface of the transmission. In this case, the third motor and the clutch control valve can be arranged in a compact manner.

The vehicle body frame preferably has a left side part and a right side part. The first motor and the second motor are arranged between the left side part and the right side part. In this case, an increase in the distance between the left side part and the right side part can be suppressed.

A cooling oil tank for storing cooling oil for cooling the first motor and the second motor is preferably further provided. The cooling oil tank is positioned below the first motor and the second motor. In this case, cooling oil can be recovered in the cooling oil tank from the first motor and the second motor due to gravity. As a result, the cooling oil can be circulated effectively.

An increase in the size of the transmission in the vehicle width direction is suppressed in the wheel loader according to the first aspect of the present invention. Moreover, the center of gravity of the transmission can be lowered due to the first motor and the second motor, which are heavy objects, being arranged in a low position.

DESCRIPTION OF EXEMPLARY EMBODIMENTS

Figure 1:
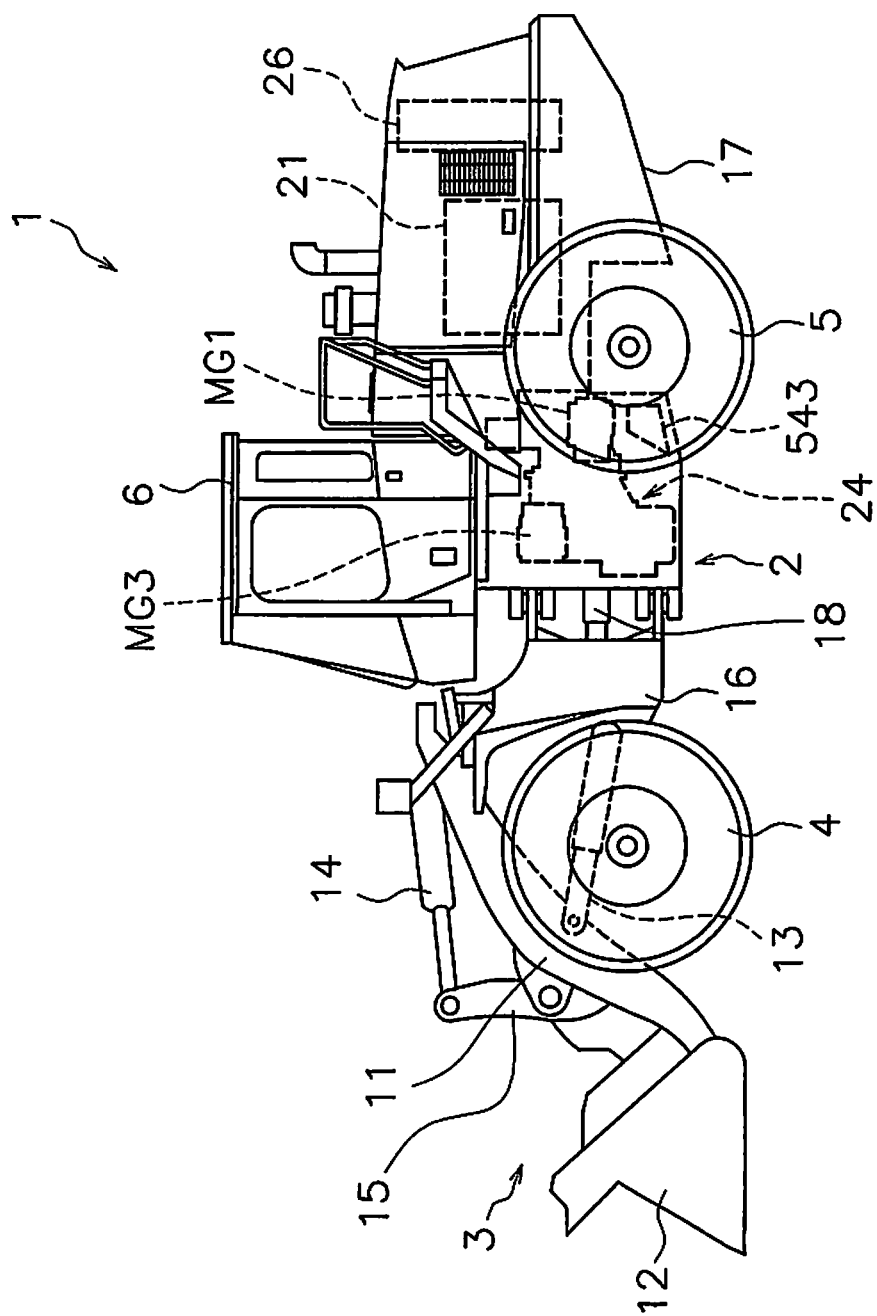
FIG. 1 is a side view of a wheel loader according to an exemplary embodiment.

Exemplary embodiments of the present invention will be explained in detail with reference to the figures. FIG. 1 is a side view of a wheel loader 1 according to an exemplary embodiment of the present invention. The wheel loader 1 includes a vehicle body frame 2, a work implement 3, traveling wheels 4 and 5, and an operating cabin 6 as illustrated in FIG. 1. The wheel loader 1 travels due to the traveling wheels 4 and 5 being driven in a rotating manner. The wheel loader 1 is able to carry out work, such as excavation, by using the work implement 3.

The work implement 3 and the traveling wheels 4 are attached to the vehicle body frame 2. The work implement 3 is driven by hydraulic fluid from a below-mentioned work implement pump 23 (see FIG. 2). The work implement 3 has a boom 11 and a bucket 12. The boom 11 is mounted on the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the vehicle body frame 2. The other end of the lift cylinder 13 is attached to the boom 11. The boom 11 swings up and down due to the extension and contraction of the lift cylinder 13 due to hydraulic fluid from the work implement pump 23. The bucket 12 is attached to the tip of the boom 11. One end of the bucket cylinder 14 is attached to the vehicle body frame 2. The other end of the bucket cylinder 14 is attached to the bucket 12 via a bell crank 15. The bucket 12 swings up and down due to the extension and contraction of the bucket cylinder 14 due to hydraulic fluid from the work implement pump 23.

The operating cabin 6 and the traveling wheels 5 are attached to the vehicle body frame 2. The operating cabin 6 is mounted on the vehicle body frame 2. A seat for the operator and a below-mentioned operating device are disposed in the operating cabin 6. The vehicle body frame 2 has a front frame 16 and a rear frame 17. The front frame 16 and the rear frame 17 are attached to each other in a manner that allows swinging in the left-right direction.

The work implement 3 is attached to the front frame 16. The operating cabin 6 is mounted on the rear frame 17. Devices such as a below-mentioned engine 21, a transmission 24, and a cooling device 26 are also mounted on the rear frame 17. The transmission 24 is positioned in front of the engine 21. The cooling device 26 is positioned behind the engine 21. The cooling device 26 has a radiator for cooling liquid coolant for the engine 21.

The wheel loader 1 has a steering cylinder 18. The steering cylinder 18 is attached to the front frame 16 and the rear frame 17. The steering cylinder 18 is a hydraulic cylinder. The wheel loader 1 is able to change the advancing direction to the right and left with the extension and contraction of the steering cylinder 18 due to hydraulic fluid from a below-mentioned steering pump 30.

Figure 2:
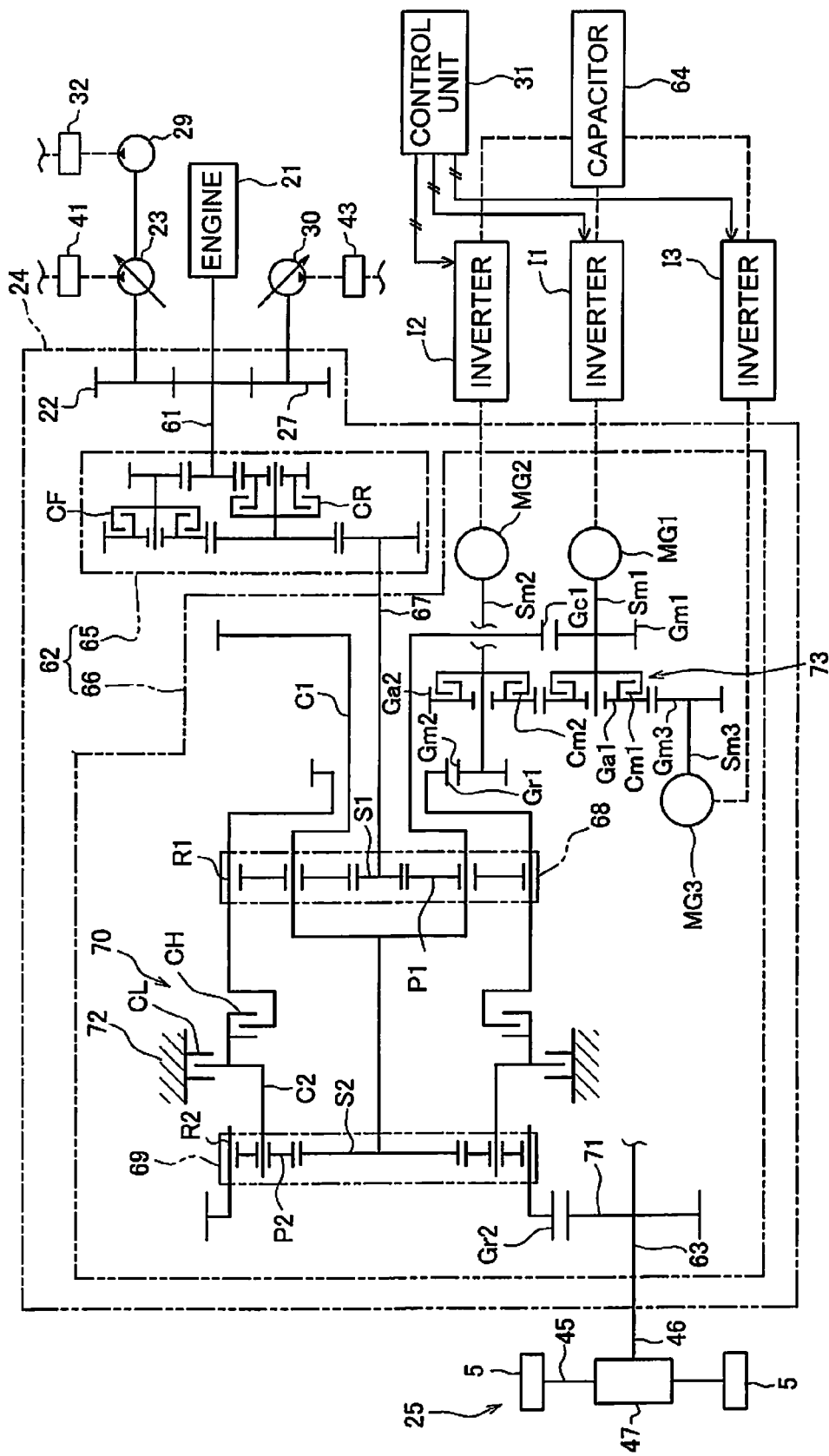
FIG. 2 is a schematic view of a configuration of the wheel loader.

FIG. 2 is a schematic view of a configuration of the wheel loader 1. As illustrated in FIG. 2, the wheel loader 1 is provided with the engine 21, the work implement pump 23, a transmission pump 29, the steering pump 30, the transmission 24, and a travel device 25.

The engine 21 is, for example, a diesel engine. The engine 21 generates driving power for driving the travel device 25, the work implement pump 23, the transmission pump 29, the steering pump 30, and the like.

The work implement pump 23, the transmission pump 29, and the steering pump 30 are hydraulic pumps. The work implement pump 23, the transmission pump 29, and the steering pump 30 are driven by driving power from the engine 21.

The work implement pump 23 is a variable displacement hydraulic pump. Hydraulic fluid discharged from the work implement pump 23 is supplied to the lift cylinder 13 and the bucket cylinder 14 through a work implement control valve 41.

The transmission pump 29 is a fixed displacement hydraulic pump. Hydraulic fluid discharged from the transmission pump 29 is supplied to various below-mentioned clutches of the transmission 24 via a clutch control valve 32.

The steering pump 30 is a variable displacement hydraulic pump. Hydraulic fluid discharged from the steering pump 30 is supplied to the above-mentioned steering cylinder 18 through a steering control valve 43.

The transmission 24 transmits driving power from the engine 21 to the travel device 25. The transmission 24 changes the speed and outputs the driving power from the engine 21. A configuration of the transmission 24 is discussed in detail below.

The travel device 25 is driven by the engine 21. The travel device 25 has a transmission shaft 46, an axle shaft 45, and the above-mentioned traveling wheels 5. The transmission shaft 46 transmits driving power from the transmission 24 to the axle shaft 45. The axle shaft 45 extends in the vehicle width direction and is connected to the traveling wheels 5. The axle shaft 45 transmits driving power from the transmission 24 to the traveling wheels 5. As a result, the traveling wheels 5 rotate.

A configuration of the transmission 24 is discussed in detail next. The transmission 24 is provided with an input shaft 61, a first power take-off mechanism 22 (referred to below as "first PTO 22"), a second power take-off mechanism 27 (referred to below as "second PTO 27"), a gear mechanism 62, an output shaft 63, a first motor MG1, a second motor MG2, and a third motor MG3.

The rotation from the engine 21 is inputted to the input shaft 61. The gear mechanism 62 transmits the rotation of the input shaft 61 to the output shaft 63. The output shaft 63 is connected to the above-mentioned travel device 25, and transmits the rotation from the gear mechanism 62 to the travel device 25.

The first PTO 22 is connected to the input shaft 61 and transmits a portion of the driving power from the engine 21 to the work implement pump 23 and the transmission pump 29. The second PTO 27 is connected to the input shaft 61 parallel to the first PTO 22 and transmits a portion of the driving power from the engine 21 to the steering pump 30.

The gear mechanism 62 is a mechanism for transmitting driving power from the engine 21. The gear mechanism 62 is configured so that the rotation speed ratio of the output shaft 63 with respect to the input shaft 61 is changed in response to changes in the rotation speeds of the motors MG1, MG2, and MG3. The gear mechanism 62 has a FR switch mechanism 65 and a speed change mechanism 66.

The FR switch mechanism 65 has a forward movement clutch CF, a reverse movement clutch CR, and various types of gears. The forward movement clutch CF and the reverse movement clutch CR are hydraulic clutches. The direction of the rotation outputted from the FR switch mechanism 65 is switched due to the switching between connected/disconnected states of the forward movement clutch CF and connected/disconnected states of the reverse movement clutch CR.

The speed change mechanism 66 has a middle shaft 67, a first planetary gear mechanism 68, a second planetary gear mechanism 69, a Hi/Lo switch mechanism 70, and an output gear 71. The middle shaft 67 is coupled to the FR switch mechanism 65. The first planetary gear mechanism 68 and the second planetary gear mechanism 69 are disposed on the same axis as the middle shaft 67.

The first planetary gear mechanism 68 has a first sun gear S1, a plurality of first planet gears P1, a first carrier C1 that supports the plurality of first planet gears P1, and a first ring gear R1. The first sun gear S1 is coupled to the middle shaft 67. The plurality of first planet gears P1 mesh with the first sun gear S1 and are supported in a rotatable manner by the first carrier C1. A first carrier gear Gc1 is provided on an outer peripheral part of the first carrier C1. The first ring gear R1 meshes with the plurality of first planet gears P1 and is able to rotate. A first ring outer periphery gear Gr1 is provided on the outer periphery of the first ring gear R1.

The second planetary gear mechanism 69 has a second sun gear S2, a plurality of second planet gears P2, a second carrier C2 that supports the plurality of second planet gears P2, and a second ring gear R2. The second sun gear S2 is coupled to the first carrier C1. The plurality of second planet gears P2 mesh with the second sun gear S2 and are supported in a rotatable manner by the second carrier C2. The second ring gear R2 meshes with the plurality of second planet gears P2 and is able to rotate. A second ring outer periphery gear Gr2 is provided on the outer periphery of the second ring gear R2. The second ring outer periphery gear Gr2 meshes with the output gear 71, and the rotation of the second ring gear R2 is outputted to the output shaft 63 via the output gear 71.

The Hi/Lo switch mechanism 70 is a mechanism for switching the driving power transmission path of the transmission 24 between a high-speed mode (Hi mode) in which the vehicle speed is high and a low-speed mode (Lo mode) in which the vehicle speed is low. The Hi/Lo switch mechanism 70 has a Hi-clutch CH that is ON during the Hi mode and a Lo-clutch CL that is ON during the Lo mode. The Hi-clutch CH connects or disconnects the first ring gear R1 and the second carrier C2. The Lo-clutch CL connects or disconnects the second carrier C2 and a fixed end 72 to prohibit or allow the rotation of the second carrier C2.

The clutches CH and CL are hydraulic clutches, and hydraulic fluid from the transmission pump 29 is supplied to each of the clutches CH and CL. The hydraulic fluid for the clutches CH and CL is controlled by the clutch control valve 32.

The first motor MG1, the second motor MG2, and the third motor MG3 function as drive motors that generate driving power using electrical energy. The first motor MG1, the second motor MG2, and the third motor MG3 also function as generators that use inputted driving power to generate electrical energy.

A first motor gear Gm1 is fixed to a rotating shaft Sm1 of the first motor MG1. The first motor gear Gm1 meshes with the first carrier gear Gc1. A second motor gear Gm2 is fixed to a rotating shaft Sm2 of the second motor MG2. The second motor gear Gm2 meshes with the first ring outer periphery gear Gr1.

The third motor MG3 assists the first motor MG1 and the second motor MG2. The speed change mechanism 66 has a motor switching mechanism 73, and the motor switching mechanism 73 selectively switches the target of the assistance from the third motor MG3 to the first motor MG1 or the second motor MG2.

Specifically, the motor switching mechanism 73 has a first motor clutch Cm1, a second motor clutch Cm2, a first connecting gear Ga1, and a second connecting gear Ga2. A third motor gear Gm3 is connected to a rotating shaft Sm3 of the third motor MG3, and the third motor gear Gm3 meshes with the first connecting gear Ga1. The first motor clutch Cm1 switches between connecting and disconnecting the first connecting gear Ga1 and the rotating shaft Sm1 of the first motor MG1. The first connecting gear Ga1 meshes with the second connecting gear Ga2. The second motor clutch Cm2 switches between connecting and disconnecting the second connecting gear Ga2 and the rotating shaft Sm2 of the second motor MG2.

The first motor clutch Cm1 and the second motor clutch Cm2 are hydraulic clutches. Hydraulic fluid from the transmission pump 29 is supplied to each of the motor clutches Cm1 and Cm2. The hydraulic fluid for the motor clutches Cm1 and Cm2 is controlled by the clutch control valve 32.

While the first motor clutch Cm1 is connected and the second motor clutch Cm2 is disconnected, the third motor gear Gm3 assists the first motor MG1. While the second motor clutch Cm2 is connected and the first motor clutch Cm1 is disconnected, the third motor gear Gm3 assists the second motor MG2.

The first motor MG1 is connected to a capacitor 64 via a first inverter I1. The second motor MG2 is connected to the capacitor 64 via a second inverter I2. The third motor MG3 is connected to the capacitor 64 via a third inverter I3.

The capacitor 64 functions as an energy reservoir unit for storing energy generated by the motors MG1, MG2, and MG3. That is, the capacitor 64 stores electrical power generated by the motors MG1, MG2, and MG3 when the total electrical power generation amount of the motors MG1, MG2, and MG3 is high. The capacitor 64 releases electrical power when the total electrical power consumption amount of the motors MG1, MG2, and MG3 is high. That is, the motors MG1, MG2 and MG3 are driven by electrical power stored in the capacitor 64. A battery may be used as another electrical power storage means in place of the capacitor.

The wheel loader 1 is provided with a control unit 31. The control unit 31 applies command signals for indicating the command torques for the motors MG1, MG2, and MG3 to the inverters I1, I2, and I3. The control unit 31 applies command signals for controlling the clutch hydraulic pressure of the clutches CF, CR, CH, CL, Cm1, and Cm2 to the clutch control valve 32. The clutch control valve 32 includes a plurality of valves for controlling the clutches CF, CR, CH, CL, Cm1, and Cm2.

The motors MG1, MG2, and MG3 and the clutches CF, CR, CH, CL, Cm1, and Cm2 are controlled with command signals from the control unit 31, whereby the speed change ratio and the output torque of the transmission 24 is controlled. The operations of the transmission 24 are discussed below.

Figures 3, 4:
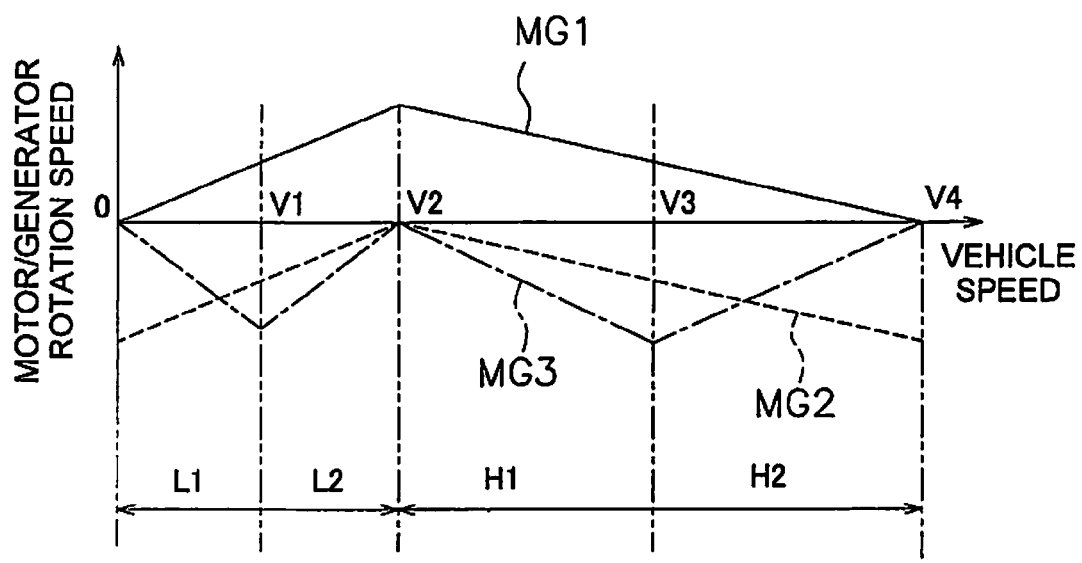
FIG. 3 is a table illustrating functions of first to third motors and states of clutches.
FIG. 4 illustrates changes in rotation speeds of the first to third motors with respect to the vehicle speed.

An outline of operations of the transmission 24 when the vehicle speed increases from zero in the forward movement side while the rotation speed of the engine 21 remains fixed, will be explained with reference to FIGS. 3 and 4. FIG. 3 illustrates functions of the motors MG1, MG2, and MG3 and states of the clutches in each of the modes. The Lo mode has an L1 mode and an L2 mode. The Hi mode has an H1 mode and an H2 mode. In FIG. 3, "M" signifies the fact that the motors MG1, MG2, and MG3 are functioning as driving motors. "G" signifies the fact that the motors MG1, MG2, and MG3 are functioning as generators. "O" signifies the fact that the clutch is in the connected state. "X" signifies the fact that the clutch is in the disconnected state.

FIG. 4 illustrates rotation speeds of the motors MG1, MG2, and MG3 with respect to the vehicle speed. When the rotation speed of the engine 21 is fixed, the vehicle speed changes in response to the rotation speed ratio of the transmission 24. The rotation speed ratio is the ratio of the rotation speed of the output shaft 63 with respect to the rotation speed of the input shaft 61. Therefore, the variation in the vehicle speed in FIG. 4 matches the variation of the rotation speed ratio of the transmission 24. That is, FIG. 4 illustrates the relationships between the rotation speeds of the motors MG1, MG2, and MG3 and the rotation speed ratio of the transmission 24. The solid line in FIG. 4 represents the rotation speed of the first motor MG1, the dashed line represents the rotation speed of the second motor MG2, and the long dashed short dashed line represents the rotation speed of the third motor MG3.

In the region in which the vehicle speed is zero or greater to less than V1, the Lo-clutch CL is connected, the Hi-clutch CH is disconnected, the first motor clutch Cm1 is connected, and the second motor clutch Cm2 is disconnected (L1 mode). Because the Hi-clutch CH is disconnected, the second carrier C2 and the first ring gear R1 are disconnected. Because the Lo-clutch CL is connected, the second carrier C2 is fixed. Moreover, the first connecting gear Ga1 is connected to the rotating shaft Sm1 of the first motor MG1 and the second connecting gear Gat is disconnected from the rotating shaft Sm2 of the second motor MG2. As a result, the third motor MG3 is connected to the first motor MG1 via the third motor gear Gm3, the first connecting gear Ga1, and the first motor clutch Cm1. The third motor MG3 is disconnected from the second motor MG2 because the second motor clutch Cm2 is disconnected.

The driving power from the engine 21 in the L1 mode is inputted to the first sun gear S1 via the middle shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. The second motor MG2 functions mainly as a generator in the L1 mode, and a portion of the electrical power generated by the second motor MG2 is stored in the capacitor 64.

The first motor MG1 and the third motor MG3 function mainly as electric motors in the L1 mode. The driving power of the first motor MG1 and the third motor MG3 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

In the region in which the vehicle speed is V1 or greater to less than V2, the Lo-clutch CL is connected, the Hi-clutch CH is disconnected, the first motor clutch Cm1 is disconnected, and the second motor clutch Cm2 is connected (L2 mode). Therefore, the second connecting gear Ga2 is connected to the rotating shaft Sm2 of the second motor MG2 and the first connecting gear Ga1 is disconnected from the rotating shaft Sm1 of the first motor MG1. As a result, the third motor MG3 is connected to the second motor MG2 via the third motor gear Gm3, the first connecting gear Ga1, the second connecting gear Ga2, and the second motor clutch Cm2. The third motor MG3 is disconnected from the first motor MG1 because the first motor clutch Cm1 is disconnected.

The driving power from the engine 21 in the L2 mode is inputted to the first sun gear S1 via the middle shaft 67, and the driving power is outputted from the first carrier C1 to the second sun gear S2. Conversely, the driving power inputted to the first sun gear S1 is transmitted from the first planet gears P1 to the first ring gear R1 and outputted through the first ring outer periphery gear Gr1 and the second motor gear Gm2 to the second motor MG2. Moreover, the driving power is outputted from the second motor gear Gm2 to the third motor MG3 via the second motor clutch Cm2, the second connecting gear Ga2, the first connecting gear Ga1, and the third motor gear Gm3. The second motor MG2 and the third motor MG3 function mainly as generators in the L2 mode, and a portion of the electrical power generated by the second motor MG2 and the third motor MG3 is stored in the capacitor 64.

The first motor MG1 functions mainly as an electric motor in the L2 mode. The driving power of the first motor MG1 is outputted to the second sun gear S2 along a path from the first motor gear Gm1 to the first carrier gear Gc1 to the first carrier C1. The driving power outputted to the second sun gear S2 as described above is transmitted to the output shaft 63 along a path from the second planet gears P2 to the second ring gear R2 to the second ring outer periphery gear Gr2 to the output gear 71.

In the region in which the vehicle speed is V2 or greater to less than V3, the Lo-clutch CL is disconnected, the Hi-clutch CH is connected, the first motor clutch Cm1 is disconnected, and the second motor clutch Cm2 is connected (H1 mode). Because the Hi-clutch CH is connected in the H1 mode, the second carrier C2 and the first ring gear R1 are connected. Because the Lo-clutch CL is disconnected, the second carrier C2 is released. Therefore, the rotation speeds of the first ring gear R1 and the second carrier C2 match. Moreover, the second connecting gear Ga2 is connected to the rotating shaft Sm2 of the second motor MG2 and the first connecting gear Ga1 is disconnected from the rotating shaft Sm1 of the first motor MG1. As a result, the third motor MG3 is connected to the second motor MG2 via the third motor gear Gm3, the first connecting gear Ga1, the second connecting gear Ga2, and the second motor clutch Cm2. The third motor MG3 is disconnected from the first motor MG1 because the first motor clutch Cm1 is disconnected.

The driving power from the engine 21 in the H1 mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1. The first motor MG1 functions mainly as a generator in the H1 mode, and thus a portion of the electrical power generated by the first motor MG1 is stored in the capacitor 64.

The second motor MG2 and the third motor MG3 function mainly as electric motors in the H1 mode. The driving power of the third motor MG3 is transmitted to the rotating shaft Sm2 of the second motor MG2 via the third motor gear Gm3, the first connecting gear Ga1, the second connecting gear Ga2, and the second motor clutch Cm2. The driving power of the second motor MG2 and the driving power of the third motor MG3 are outputted to the second carrier C2 along a path from the second motor gear Gm2 to the first ring outer periphery gear Gr1 to the first ring gear R1 to the Hi-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

In the region in which the vehicle speed is V3 or greater to less than V4, the Lo-clutch CL is disconnected, the Hi-clutch CH is connected, the first motor clutch Cm1 is connected, and the second motor clutch Cm2 is disconnected (H2 mode). In the H2 mode, the first connecting gear Ga1 is connected to the rotating shaft Sm1 of the first motor MG1 and the second connecting gear Ga2 is disconnected from the rotating shaft Sm2 of the second motor MG2. As a result, the third motor MG3 is connected to the first motor MG1 via the third motor gear Gm3, the first connecting gear Ga1, and the first motor clutch Cm1. The third motor MG3 is disconnected from the second motor MG2 because the second motor clutch Cm2 is disconnected.

The driving power from the engine 21 in the H2 mode is inputted to the first sun gear S1 and the driving power is outputted from the first carrier C1 to the second sun gear S2. The driving power inputted to the first sun gear S1 is outputted from the first carrier C1 through the first carrier gear Gc1 and the first motor gear Gm1 to the first motor MG1 and the third motor MG3. The first motor MG1 and the third motor MG3 function mainly as generators in the H2 mode, and thus a portion of the electrical power generated by the first motor MG1 and the third motor MG3 is stored in the capacitor 64.

The second motor MG2 functions mainly as an electric motor in the H2 mode. The driving power of the second motor MG2 is outputted to the second carrier C2 along a path from the second motor gear Gm2 to the first ring outer periphery gear Gr1 to the first ring gear R1 to the Hi-clutch CH. The driving power outputted to the second sun gear S2 as described above is outputted through the second planet gears P2 to the second ring gear R2, and the driving power outputted to the second carrier C2 is outputted through the second planet gears P2 to the second ring gear R2. The driving power combined by the second ring gear R2 in this way is transmitted through the second ring outer periphery gear Gr2 and the output gear 71 to the output shaft 63.

While forward movement driving has been discussed above, the operations of reverse movement driving are the same.

Figure 5:
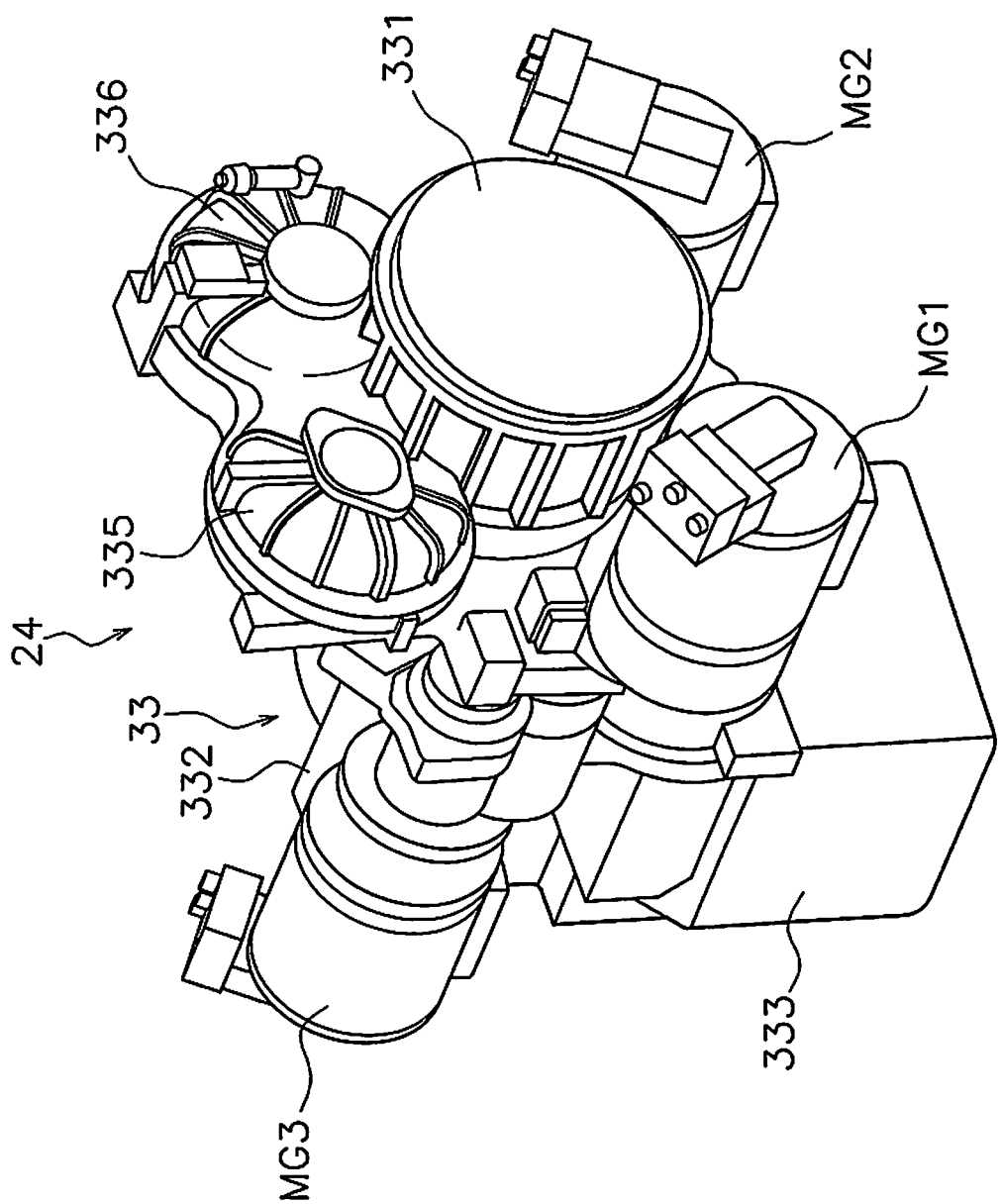
FIG. 5 is a perspective view of a transmission.
Figure 6:
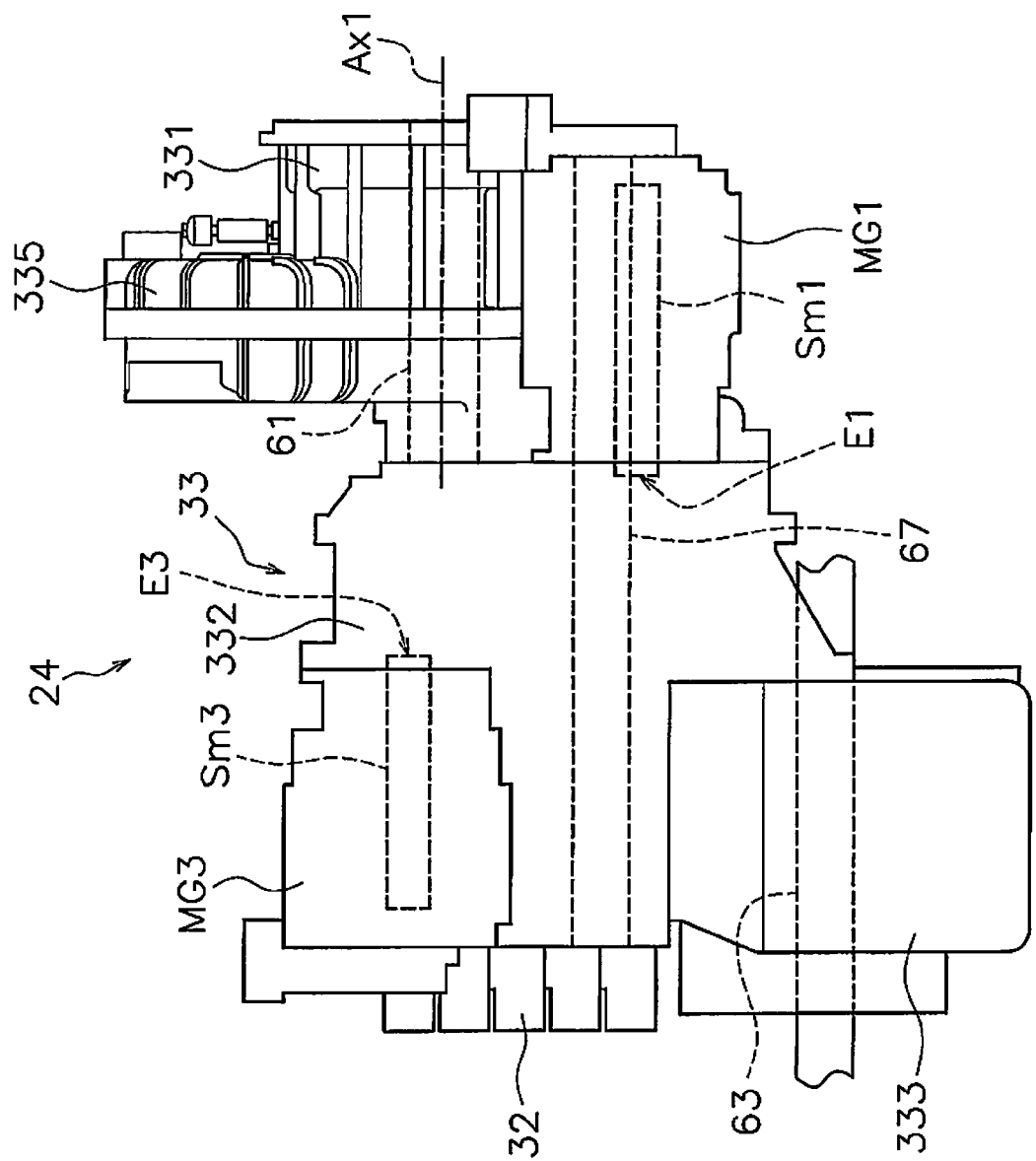
FIG. 6 is a left side surface view of the transmission.
Figure 7:
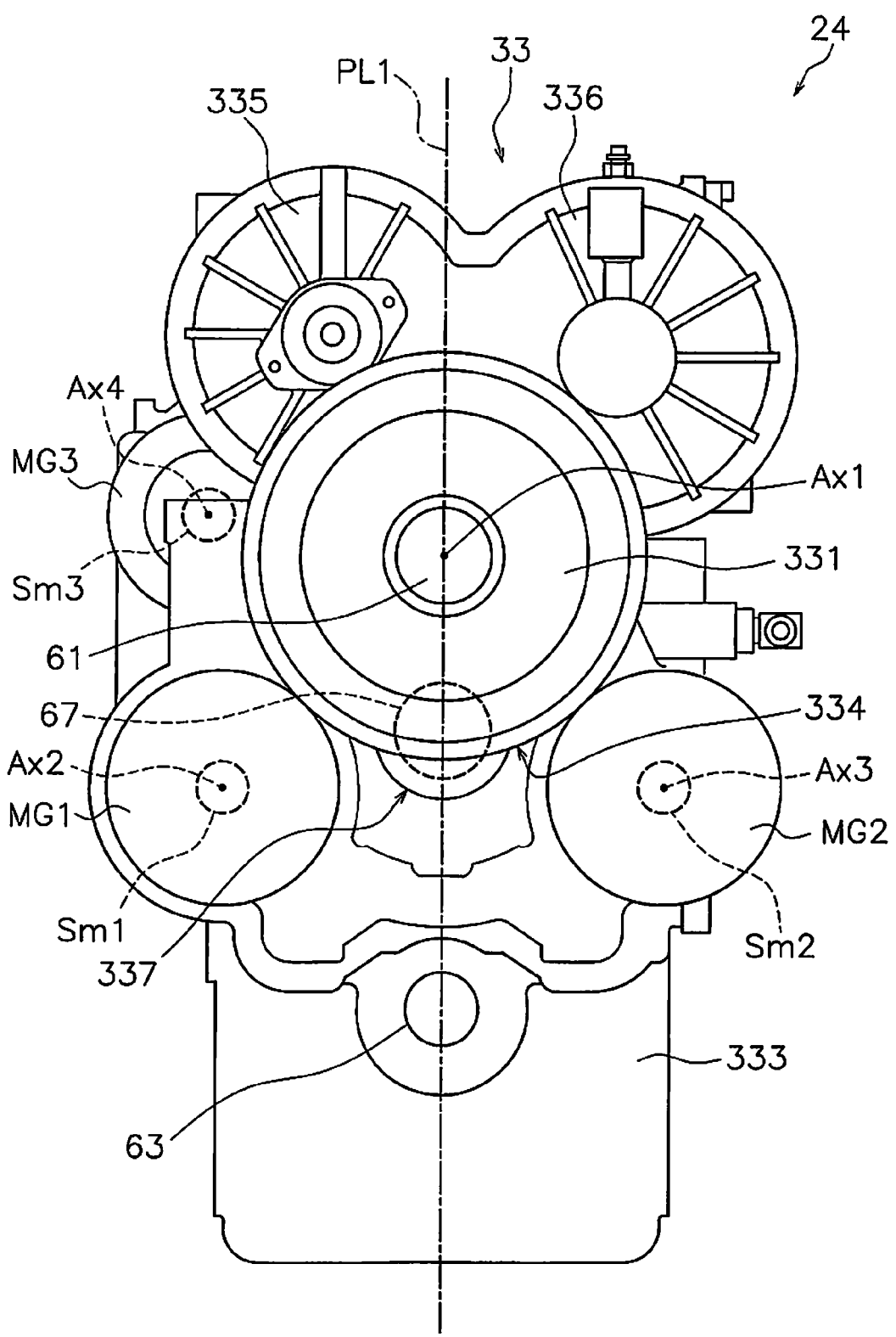
FIG. 7 is a rear surface view of the transmission.

Next, a configuration of the transmission 24 will be discussed. FIG. 5 is a perspective view of a transmission 24. FIG. 6 is a left side surface side view of the transmission 24. FIG. 7 is a rear surface view of the transmission 24.

The transmission 24 has a transmission case 33. The transmission case 33 houses the input shaft 61, the gear mechanism 62, and the output shaft 63. Specifically, the transmission case 33 has an input shaft case 331, a middle shaft case 332, and an output shaft case 333. The input shaft case 331 houses the input shaft 61. The input shaft 61 extends in the front-back direction (longitudinal direction) of the vehicle (i.e., the left-to-right direction of FIG. 1). As illustrated in FIG. 7, a lower part of the input shaft case 331 includes a curved surface part 334. The curved surface part 334 is curved to protrude downwards. Specifically, the input shaft case 331 has a shape that is approximately cylindrical. The center axis of the input shaft case 331 extends in the vehicle front-back direction. The center axis of the input shaft case 331 matches a center axis Ax1 of the input shaft 61.

The transmission case 33 has a first PTO case 335 and a second PTO case 336. The first PTO case 335 houses the first PTO 22 (see FIG. 2). The second PTO case 336 houses the second PTO 27 (see FIG. 2). The first PTO case 335 and the second PTO case 336 are positioned over the input shaft case 331. The first PTO case 335 and the second PTO case 336 are connected to the input shaft case 331. The first PTO case 335 and the second PTO case 336 are arranged in a row in the vehicle width direction.

The middle shaft case 332 houses the above-mentioned first planetary gear mechanism 68 and the second planetary gear mechanism 69. Furthermore, the middle shaft case 332 houses the middle shaft 67. The middle shaft 67 extends in the vehicle front-back direction and is positioned under the input shaft 61. The middle shaft case 332 is arranged in line with the input shaft case 331 in the vehicle front-back direction. Specifically, the middle shaft case 332 is positioned in front of the input shaft case 331. The middle shaft case 332 is positioned forward the first PTO case 335 and the second PTO case 336. A bottom part of the middle shaft case 332 is positioned below a bottom part of the input shaft case 331. The above-mentioned clutch control valve 32 is attached to the front surface of the middle shaft case 332.

As illustrated in FIG. 7, the transmission case 33 further has a protruding part 337 that protrudes downward from the bottom part of the input shaft case 331. The protruding part 337 extends in the vehicle front-back direction and is connected to the middle shaft case 332. A portion of the middle shaft 67 positioned further to the rear of the middle shaft case 332 is arranged inside the protruding part 337.

The output shaft case 333 houses the output shaft 63. The output shaft case 333 is positioned under the middle shaft case 332. The output shaft case 333 is positioned forward of the input shaft case 331. A bottom part of the output shaft case 333 is positioned the furthest below the transmission case 33. The output shaft 63 protrudes from the output shaft case 333. The output shaft 63 extends in the vehicle front-back direction and is coupled to the transmission shaft 46.

The first motor MG1, the second motor MG2, and the third motor MG3 are attached to the transmission case 33.

Specifically, the first motor MG1, the second motor MG2, and the third motor MG3 are attached to the middle shaft case 332.

The first motor MG1 and the second motor MG2 are arranged below the input shaft 61. The first motor MG1 and the second motor MG2 overlap the traveling wheels 5 as seen from the side surface of the vehicle (see FIG. 1). Portions of each of the first motor MG1 and the second motor MG2 overlap the curved surface part 334 as seen in a projection view in the up-down direction (vertical direction of the vehicle as shown in FIG. 1). That is, the first motor MG1 and the second motor MG2 overlap the input shaft case 331 as seen in a projection view in the up-down direction (see FIG. 15). Portions of each of the first motor MG1 and the second motor MG2 overlap the middle shaft case 332 as seen in the vehicle front-back direction. The first PTO case 335 and the second PTO case 336 are arranged over the first motor MG1 and the second motor MG2. The output shaft case 333 is positioned forward the first motor MG1 and the second motor MG2 and protrudes to a position below the first motor MG1.

As illustrated in FIG. 7, the first motor MG1 and the second motor MG2 are arranged symmetrically relative to a vertical plane PL1 that passes through the center axis Ax1 of the input shaft 61. The input shaft 61, the middle shaft 67, and the output shaft 63 are arranged in a row in the up-down direction as seen in the shaft direction of the input shaft 61.

A rotational axis Ax2 of the first motor MG1 is positioned below the bottom part of the input shaft case 331. A rotational axis Ax3 of the second motor MG2 is positioned below the bottom part of the input shaft case 331. The bottom part of the first motor MG1 is positioned below the bottom part of the input shaft case 331. The bottom part of the second motor MG2 is positioned below the bottom part of the input shaft case 331. The uppermost part of the first motor MG1 is positioned above the bottom part of the input shaft case 331. The uppermost part of the second motor MG2 is positioned above the bottom part of the input shaft case 331. The first motor MG1 and the second motor MG2 are arranged with an interval therebetween in the vehicle width direction. The protruding part 337 is arranged between the first motor MG1 and the second motor MG2 in the vehicle width direction. That is, the middle shaft 67 is arranged between the first motor MG1 and the second motor MG2 in the vehicle width direction. The first motor MG1 and the second motor MG2 are arranged obliquely upward the output shaft 63.

The third motor MG3 is arranged beside the transmission case 33. The third motor MG3 is arranged on the same side as the first motor MG1 with respect to the vertical plane PL1 that passes through the center of the transmission case 33. In the present embodiment, the first motor MG1 and the third motor MG3 are arranged to the left of the vertical plane PL1. The second motor MG2 is arranged to the right of the vertical plane PL1 that passes through the center of the transmission case 33. The third motor MG3 is arranged by being shifted in the vehicle front-back direction with respect to the first motor MG1 and the second motor MG2. Specifically, the third motor MG3 is positioned forward the first motor MG1 and the second motor MG2. The third motor MG3 is arranged to the side of the middle shaft case 332. The third motor MG3 is positioned above the output shaft case 333.

A rotational axis Ax4 of the third motor MG3 is positioned above the rotational axis Ax2 of the first motor MG1 and the rotational axis Ax3 of the second motor MG2. As illustrated in FIG. 6, an end E1 of the rotating shaft Sm1 of the first motor MG1 and an end of the rotating shaft Sm2 of the second motor MG2 are oriented in a direction from the first motor MG1 and the second motor MG2 toward the third motor MG3 in the vehicle front-back direction. An end E3 of the rotating shaft Sm3 of the third motor MG3 is oriented in a direction from the third motor MG3 toward the first motor MG1 and the second motor MG2 in the vehicle front-back direction. Specifically, the end E1 of the rotating shaft Sm1 of the first motor MG1 and the end of the rotating shaft Sm2 of the second motor MG2 face toward the front. The end E3 of the rotating shaft Sm3 of the third motor MG3 faces toward the rear.

Figure 8:
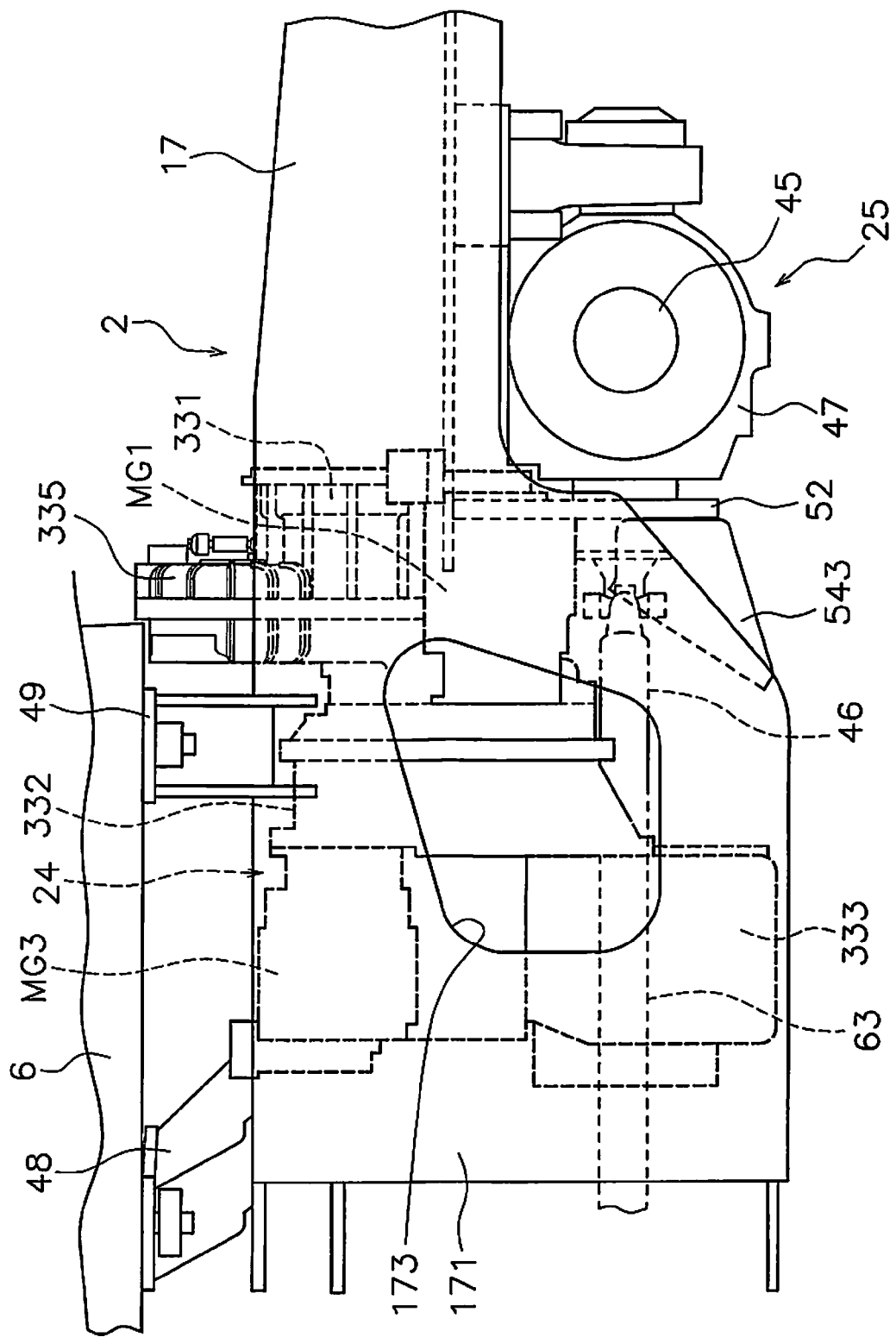
FIG. 8 is a side surface view of a portion of the rear part of the wheel loader.

FIG. 8 is a side surface view of a portion of the rear part of the wheel loader 1. A portion of the configuration such as the traveling wheels 5 and an exterior cover are omitted in FIG. 8 to facilitate understanding. As illustrated in FIG. 8, the travel device 25 has an axle housing 47. The axle housing 47 houses the axle shaft 45. The axle housing 47 is supported in a swingable (pivotable) manner on the vehicle body frame 2. Specifically, the axle housing 47 is supported in a swingable (pivotable) manner on the rear frame 17. The axle housing 47 is swingable (pivotable) around the transmission shaft 46 and consequently end parts on the left and right of the axle shaft 45 move in the up-down direction.

The first motor MG1 and the second motor MG2 are arranged by being shifted in the vehicle front-back direction with respect to the axle housing 47. Specifically, the axle housing 47 is positioned further toward the rear than the first motor MG1 and the second motor MG2. The bottom part of the first motor MG1 is arranged below the uppermost part of the axle housing 47. The bottom part of the second motor MG2 is arranged below the uppermost part of the axle housing 47.

The transmission shaft 46 is arranged under the transmission 24 and extends in the vehicle front-back direction. The transmission shaft 46 is arranged behind the output shaft case 333. The transmission shaft 46 is arranged under the middle shaft case 332. The transmission shaft 46 is arranged on the same axis as the output shaft 63. Therefore, the first motor MG1 and the second motor MG2 are arranged obliquely upward the transmission shaft 46 as seen in the axial direction of the transmission shaft 46.

Figure 9:
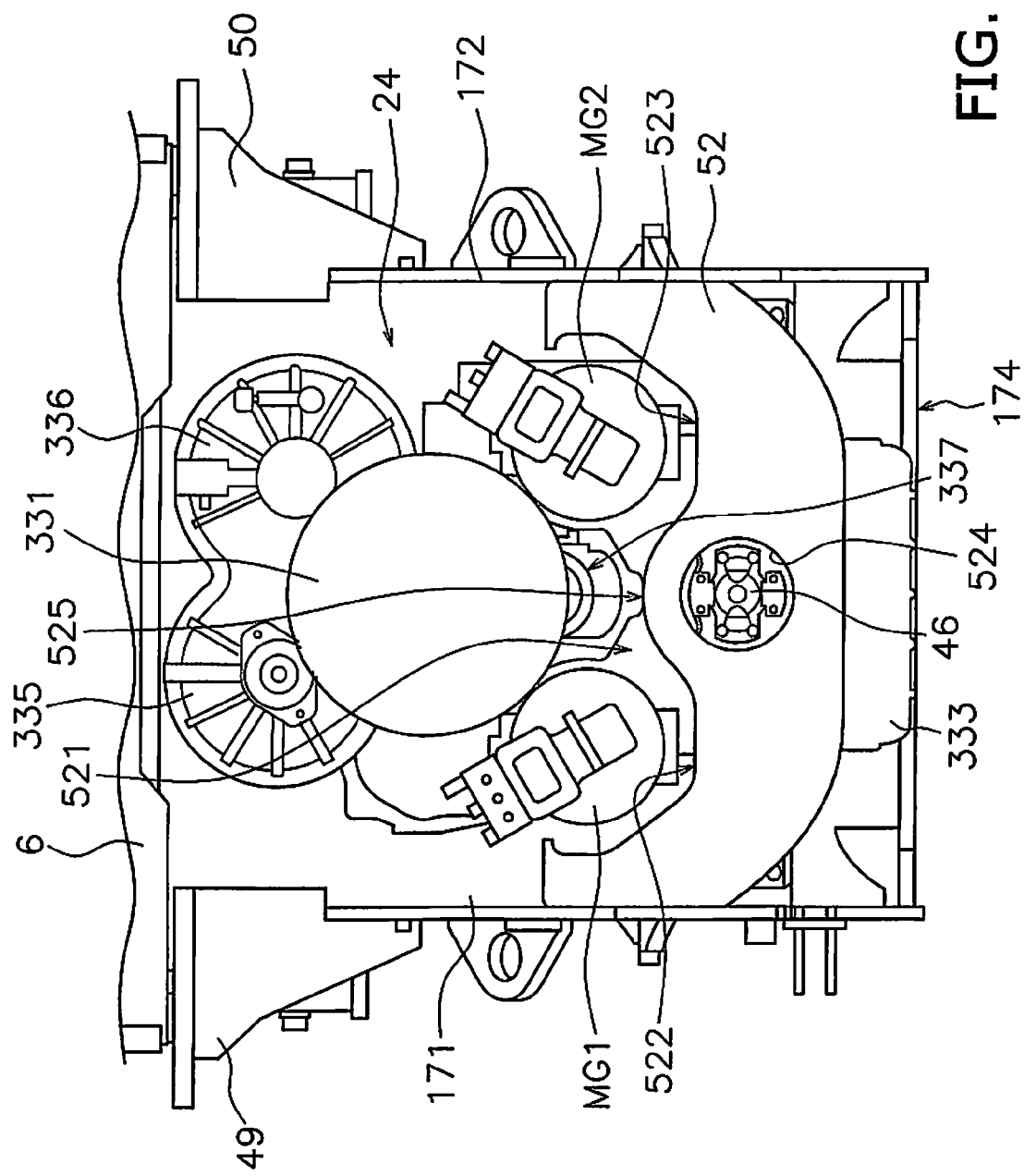
FIG. 9 is a rear surface view of a portion of the rear part of the wheel loader.

FIG. 9 is a rear surface view of a portion of the rear part of the wheel loader 1. A portion of the configuration, such as the traveling wheels 5 and the axle housing 47, are omitted in FIG. 9 to facilitate understanding. As illustrated in FIG. 9, the rear frame 17 has a left side part 171 and a right side part 172. The transmission 24 is arranged between the left side part 171 and the right side part 172 and is supported by the vehicle body frame 2. The first motor MG1 and the second motor MG2 are arranged between the left side part 171 and the right side part 172.

The rear frame 17 has a plurality of mount parts 48 to 51 (see FIG. 15) for supporting the operating cabin 6. The operating cabin 6 is attached in a detachable manner to the mount parts 48 to 51. Therefore, the operating cabin 6 is attached in a detachable manner to the vehicle body frame 2. Specifically, the plurality of mount parts 48 to 51 include a pair of front mount parts 48 and 51 and a pair of rear mount parts 49 and 50. The third motor MG3 is positioned under the operating cabin 6.

As illustrated in FIG. 8, a side part opening 173 is provided in the left side part 171. The side part opening 173 is positioned to the side of the transmission 24. A portion of the first motor MG1 opposes the side part opening 173. An exterior cover (not illustrated) is attached in a detachable manner to the left side part 171. The side part opening 173 is covered by the exterior cover while the exterior cover is attached. A portion of the first motor MG1 is visible through the side part opening 173 while the exterior cover is removed. An opening similar to the side part opening 173 of the left side part 171 is provided in the right side part 172.

Figure 10:
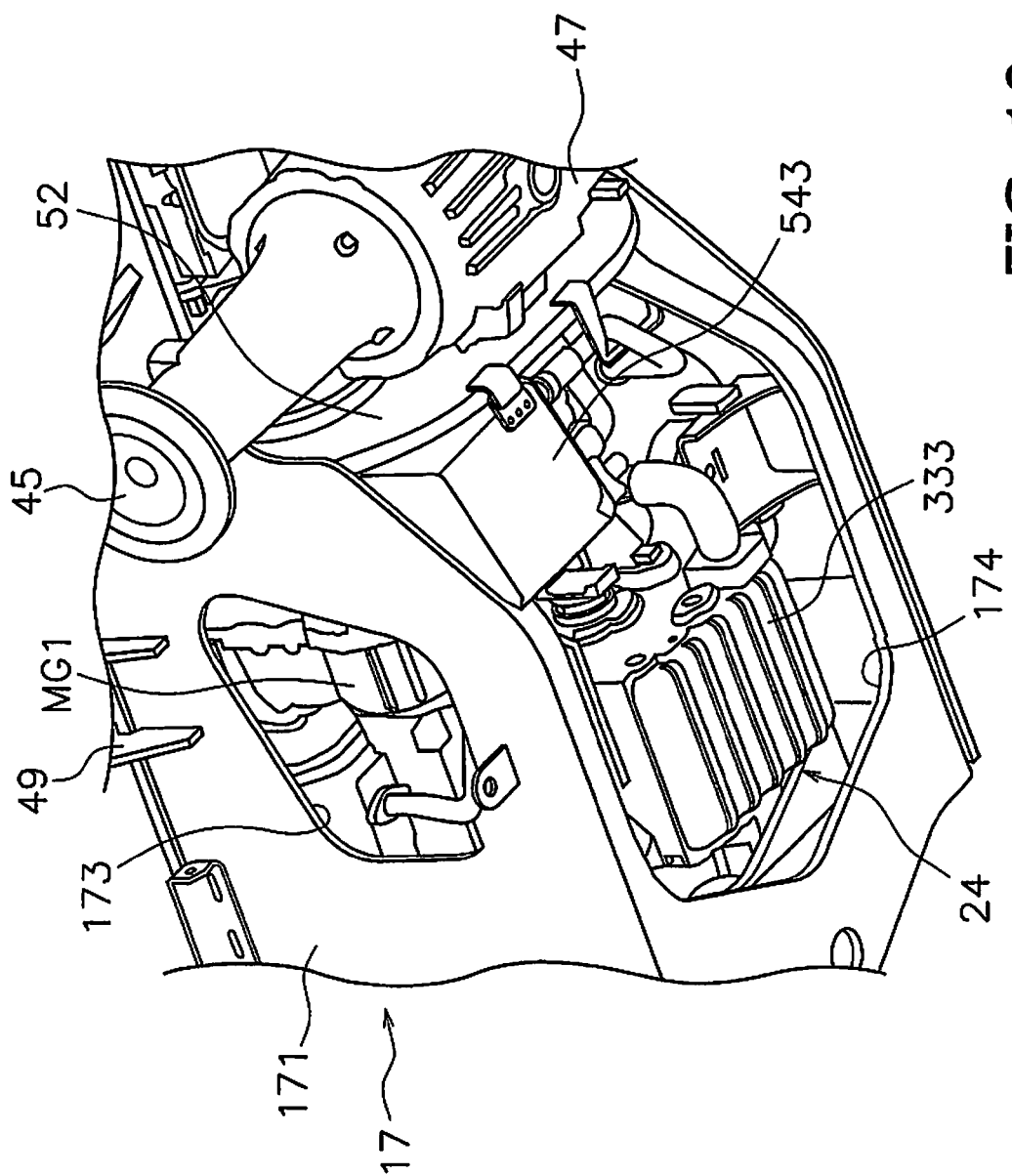
FIG. 10 is a view seen obliquely from below of a portion of the rear part of the wheel loader.

FIG. 10 is a view seen obliquely from below of a portion of the rear part of the wheel loader 1. As illustrated in FIG. 10, a bottom part opening 174 is provided in the bottom surface of the rear frame 17. The bottom part opening 174 is positioned under the transmission 24. As illustrated in FIG. 9, the bottom part opening 174 is positioned under the output shaft case 333 and the transmission shaft 46. Therefore, the bottom part opening 174 is positioned under the first motor MG1 and the second motor MG2. A bottom plate (not illustrated) is attached to the bottom surface of the rear frame 17 in a detachable manner to cover the bottom part opening 174.

As illustrated in FIG. 8, the vehicle body frame 2 further has a mount bracket 52 that supports the axle housing 47 in a swingable manner. The mount bracket 52 is positioned in front of the axle housing 47. The mount bracket 52 is a plate-like member which extends in the vehicle width direction and the up-down direction.

As illustrated in FIG. 9, an upper surface of the mount bracket 52 has a recessed part 521. The recessed part 521 has a shape that is recessed downward from the upper surface of the mount bracket 52. The first motor MG1 and the second motor MG2 are arranged to pass through the recessed part 521 in the vehicle front-back direction. Specifically, the recessed part 521 has a first recessed part 522 and a second recessed part 523. The first recessed part 522 and the second recessed part 523 are aligned in the vehicle width direction and are joined to each other. The first motor MG1 is arranged to pass through the first recessed part 522 in the vehicle front-back direction. The second motor MG2 is arranged to pass through the second recessed part 523 in the vehicle front-back direction. The protruding part 337 of the transmission case 33 is arranged between the first recessed part 522 and the second recessed part 523.

The mount bracket 52 has a through-hole 524. The through-hole 524 passes through the mount bracket 52 in the vehicle front-back direction. The through-hole 524 is located under the recessed part 521. Specifically, the recessed part 521 has ridge part 525 positioned between the first recessed part 522 and the second recessed part 523. The ridge part 525 has a shape that rises to a position above the bottom part of the first recessed part 522 and the bottom part of the second recessed part 523. The through-hole 524 is positioned under the ridge part 525. The transmission shaft 46 passes through the through-hole 524.

Figure 11A:
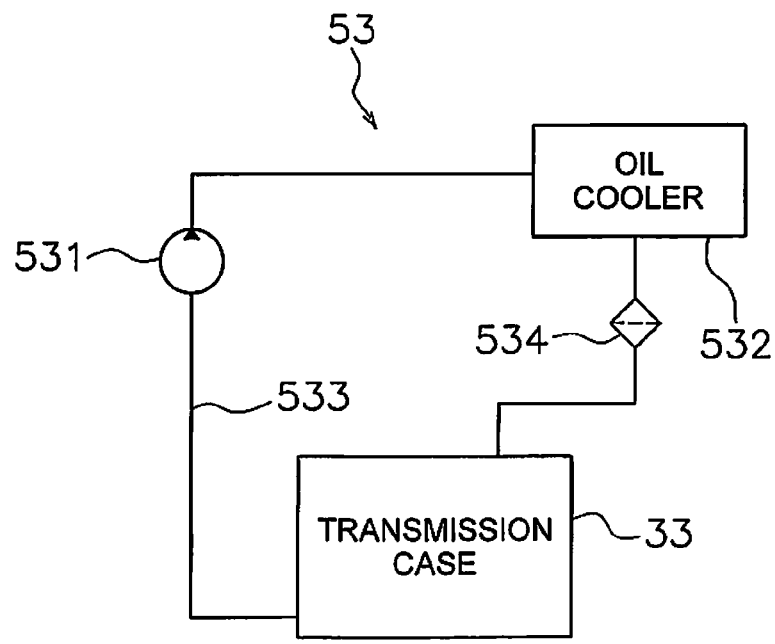
FIGS. 11A and 11B are schematic views illustrating configurations of a transmission lubrication system and a motor cooling system.
Figure 11B:
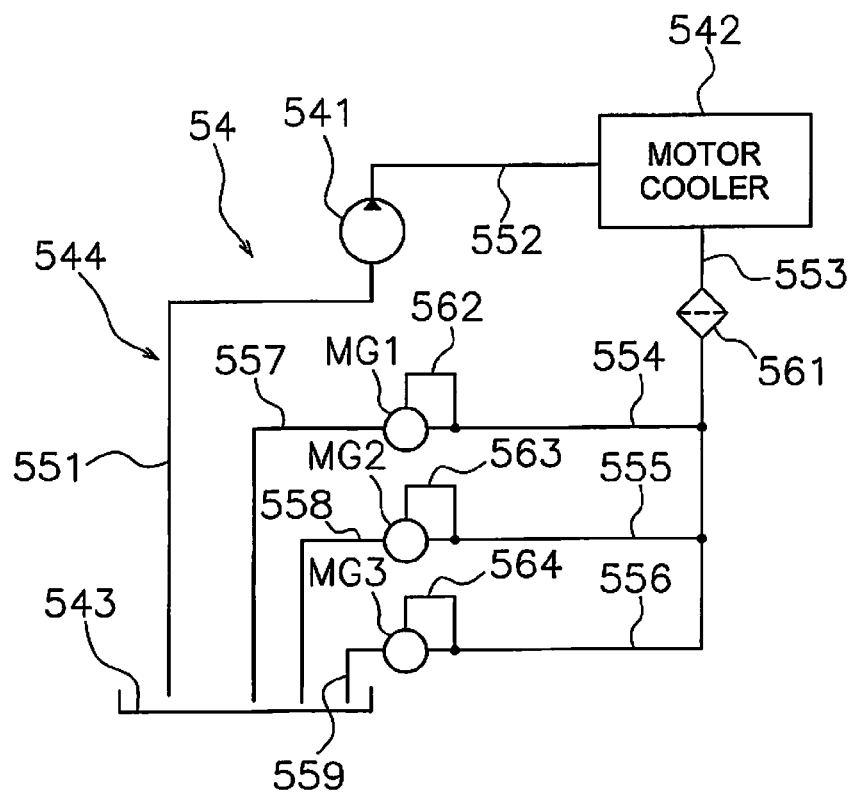

Next, a transmission lubrication system 53 and a motor cooling system 54 included in the transmission 24 will be discussed. FIG. 11A is a schematic view illustrating a configuration of the transmission lubrication system 53. FIG. 11B is a schematic view of a configuration of the motor cooling system 54. The transmission lubrication system 53 circulates lubricating oil for lubricating the transmission 24.

As illustrated in FIG. 11A, the transmission lubrication system 53 has a lubricating oil pump 531, an oil cooler 532, and a lubricating oil pipe 533. The lubricating oil pump 531 and the oil cooler 532 are connected to the transmission case 33 via the lubricating oil pipe 533. A lubricating oil filter 534 is provided between the oil cooler 532 and the transmission case 33 in the lubricating oil pipe 533.

The lubricating oil inside the transmission case 33 is stored inside the output shaft case 333. The lubricating oil pump 531 feeds the lubricating oil inside the output shaft case 333 to the oil cooler 532. The lubricating oil is cooled in the oil cooler 532 and supplied to the transmission case 33. The lubricating oil lubricates various gears inside the transmission case 33. The lubricating oil drips off the various gears and is stored in the output shaft case 333.

Figure 12:
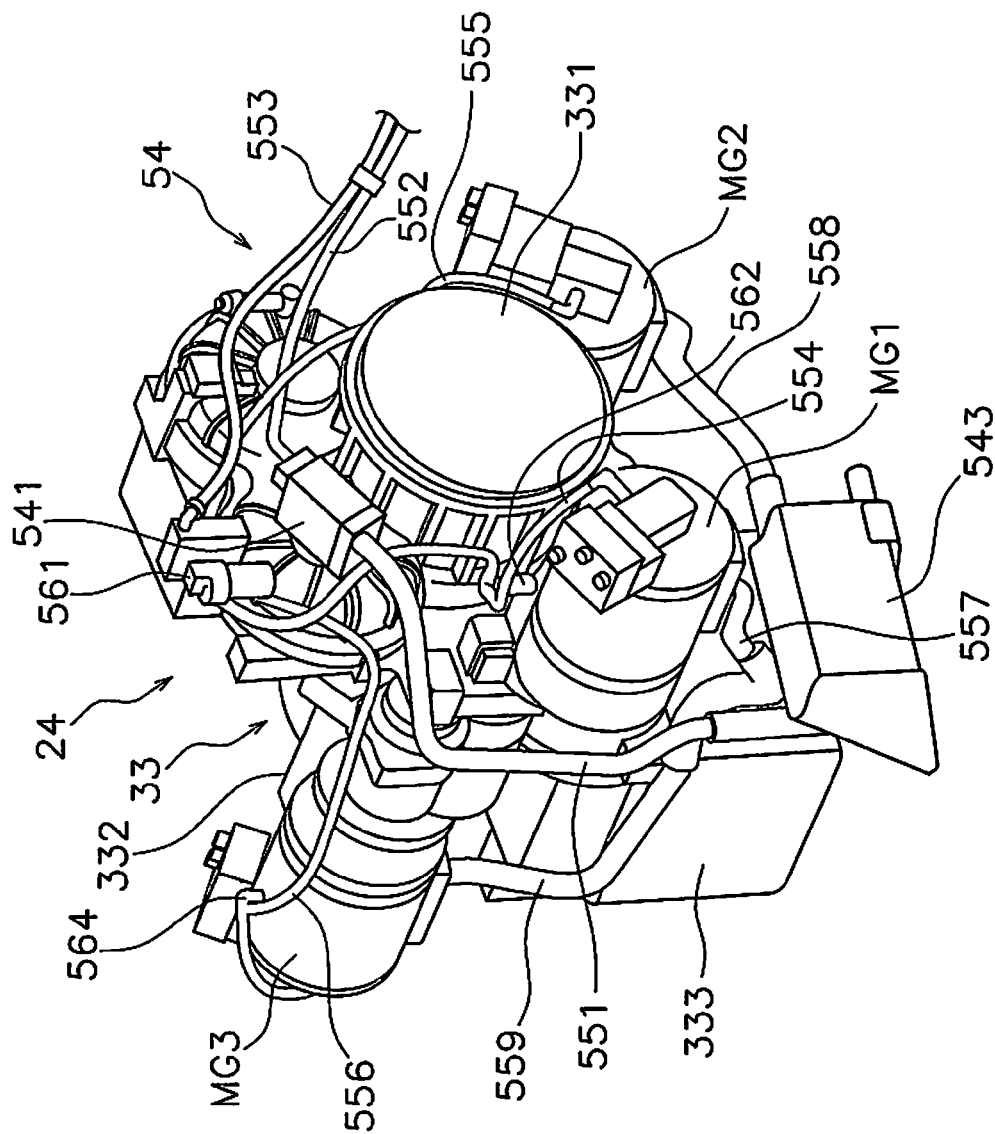
FIG. 12 is a perspective view of the transmission including the motor cooling system.

The motor cooling system 54 is separate from the transmission lubrication system 53 and circulates cooling oil for cooling the first to third motors MG1 to MG3. FIG. 12 is a perspective view of the transmission 24 including the motor cooling system 54. As illustrated in FIG. 11B and FIG. 12, the motor cooling system 54 has a cooling oil pump 541, a motor cooler 542, a cooling oil tank 543, and a cooling oil pipe 544. The cooling oil pump 541, the motor cooler 542, and the cooling oil tank 543 are connected to the first to third motors MG1 to MG3 via the cooling oil pipe 544. Specifically, the cooling oil pipe 544 includes a first cooling oil pipe 551, a second cooling oil pipe 552, a third cooling oil pipe 553, a first supply pipe 554, a second supply pipe 555, a third supply pipe 556, a first drain pipe 557, a second drain pipe 558, and a third drain pipe 559. The first cooling oil pipe 551 connects the cooling oil tank 543 and the cooling oil pump 541. The second cooling oil pipe 552 connects the cooling oil pump 541 and the motor cooler 542. The third cooling oil pipe 553 is connected to the motor cooler 542. The motor cooler 542 cools the cooling oil. The motor cooler 542 is included in the abovementioned cooling device 26 with the oil cooler 532. The third cooling oil pipe 553 is connected to the first supply pipe 554, the second supply pipe 555, and the third supply pipe 556. A cooling oil filter 561 is provided in the third cooling oil pipe 553.

The first supply pipe 554 is connected to the first motor MG1. A first branch pipe 562 is connected to the first supply pipe 554. Specifically, the first supply pipe 554 is connected to a cooling oil path inside the rotating shaft Sm1 of the first motor MG1. The first branch pipe 562 is connected to an upper part of the motor case of the first motor MG1. A configuration of the first motor MG1 is discussed below.

The second supply pipe 555 is connected to the second motor MG2. A second branch pipe 563 is connected to the second supply pipe 555. Specifically, the second supply pipe 555 is connected to a cooling oil path inside the rotating shaft Sm2 of the second motor MG2. The second branch pipe 563 is connected to an upper part of the motor case of the second motor MG2.

The third supply pipe 556 is connected to the third motor MG3. A third branch pipe 564 is connected to the third supply pipe 556. Specifically, the third supply pipe 556 is connected to a cooling oil path inside the rotating shaft Sm3 of the third motor MG3. The third branch pipe 564 is connected to an upper part of the motor case of the third motor MG3.

The first drain pipe 557 connects the first motor MG1 and the cooling oil tank 543. The second drain pipe 558 connects the second motor MG2 and the cooling oil tank 543. The third drain pipe 559 connects the third motor MG3 and the cooling oil tank 543.

The cooling oil tank 543 stores the cooling oil for cooling the first motor MG1, the second motor MG2, and the third motor MG3. The cooling oil pump 541 sucks in the cooling oil inside the cooling oil tank 543 via the first cooling oil pipe 551 and feeds the cooling oil to the motor cooler 542 via the second cooling oil pipe 552. The cooling oil is cooled by the motor cooler 542. The cooling oil is diverted from the third cooling oil pipe 553 to the first supply pipe 554, the second supply pipe 555, and the third supply pipe 556.

The cooling oil is supplied from the first supply pipe 554 and the first branch pipe 562 to the first motor MG1 to cool the first motor MG1. The cooling oil is returned from the first motor MG1 to the cooling oil tank 543 via the first drain pipe 557. The cooling oil is supplied from the second supply pipe 555 and the second branch pipe 563 to the second motor MG2 to cool the second motor MG2. The cooling oil is returned from the second motor MG2 to the cooling oil tank 543 via the second drain pipe 558. The cooling oil is supplied from the third supply pipe 556 and the third branch pipe 564 to the third motor MG3 to cool the third motor MG3. The cooling oil is returned from the third motor MG3 to the cooling oil tank 543 via the third drain pipe 559.

Figure 13:
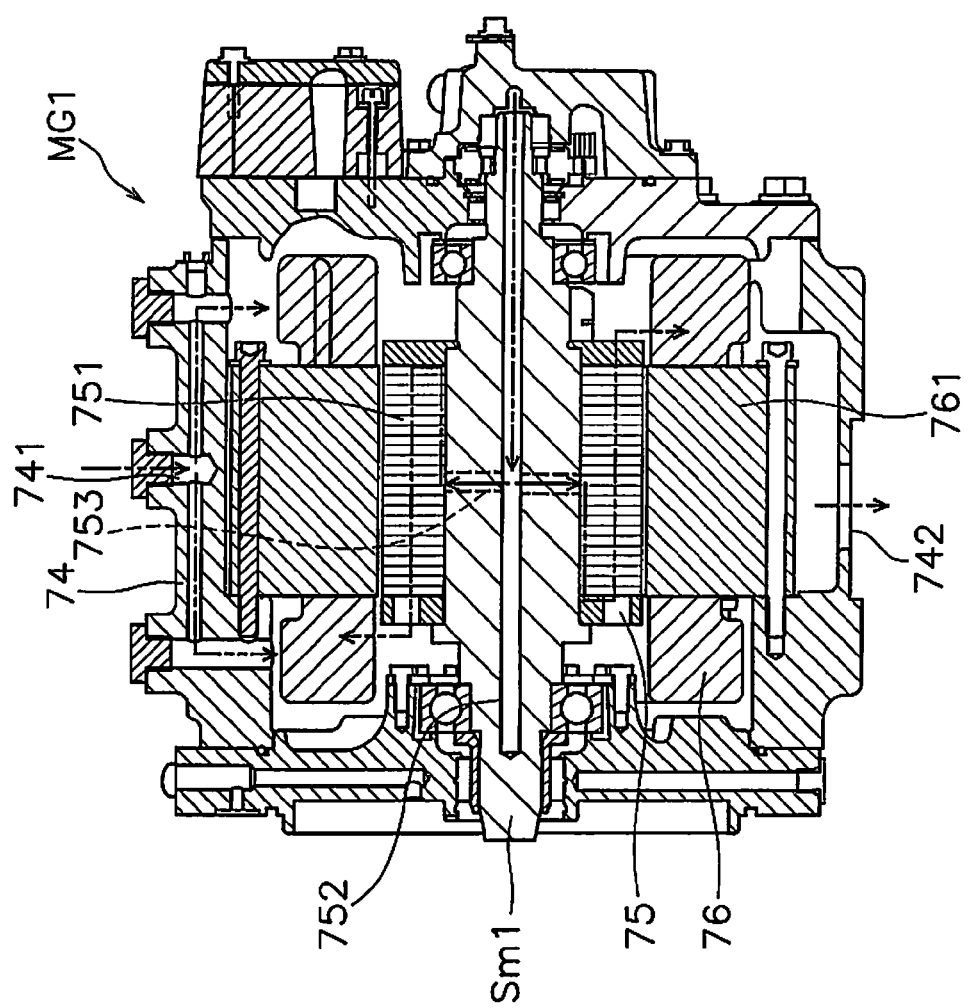
FIG. 13 is a cross-sectional view of the first motor.

FIG. 13 is a cross-sectional view of the first motor MG1. As illustrated in FIG. 13, the first motor MG1 has a motor case 74, the rotating shaft Sm1, a rotor 75, and a stator 76. The motor case 74 houses the rotating shaft Sm1, the rotor 75, and the stator 76. The rotor 75 is fixed to the rotating shaft Sm1 and is provided so as to rotate with the rotating shaft Sm1. The rotor 75 has a magnet 751. The magnet 751 is configured, for example, by stacking a plurality of thin plate-like electromagnetic steel sheets. The stator 76 is arranged so as to encircle the periphery of the rotor 75. The stator 76 has a coil 761.

The rotating shaft Sm1 has a liquid coolant path 752. The liquid coolant path 752 is provided along the center axis of the rotating shaft Sm1. The liquid coolant path 752 communicates with a through-hole 753. The through-hole 753 passes through the rotating shaft Sm1 in the axial direction. The cooling oil from the first supply pipe 554 is supplied to the liquid coolant path 752 and is supplied to the rotor 75 via the through-hole 753. The cooling oil supplied to the rotor 75 is scattered inside the motor case 74 due to centrifugal force caused by the rotation of the rotor 75.

A cooling oil supply port 741 is provided in the uppermost part of the motor case 74. The cooling oil supply port 741 communicates with a space inside the motor case 74. The abovementioned first branch pipe 562 is connected to the cooling oil supply port 741. The cooling oil from the first branch pipe 562 drips down due to gravity via the cooling oil supply port 741 whereby the cooling oil is supplied to the motor case 74.

A cooling oil drain port 742 is provided in the bottom part of the motor case 74. The cooling oil drain port 742 communicates with the space inside the motor case 74. The above-mentioned first drain pipe 557 is connected to the cooling oil drain port 742. The cooling oil supplied to the inside of the motor case 74 is returned due to gravity from the cooling oil drain port 742 to the cooling oil tank 543 via the first drain pipe 557.

Explanations of the configurations of the second motor MG2 and the third motor MG3 will be omitted because the configurations thereof are similar to the configuration of the abovementioned first motor MG1.

As illustrated in FIG. 8, the cooling oil tank 543 is positioned below the first motor MG1 and the second motor MG2. The cooling oil tank 543 is positioned below the third motor MG3. The cooling oil tank 543 is positioned behind the output shaft case 333 and under the first motor MG1. The cooling oil tank 543 is positioned in front of the axle housing 47. The cooling oil tank 543 overlaps the traveling wheels 5 as seen in a side view of the vehicle (see FIG. 1).

Figure 14:
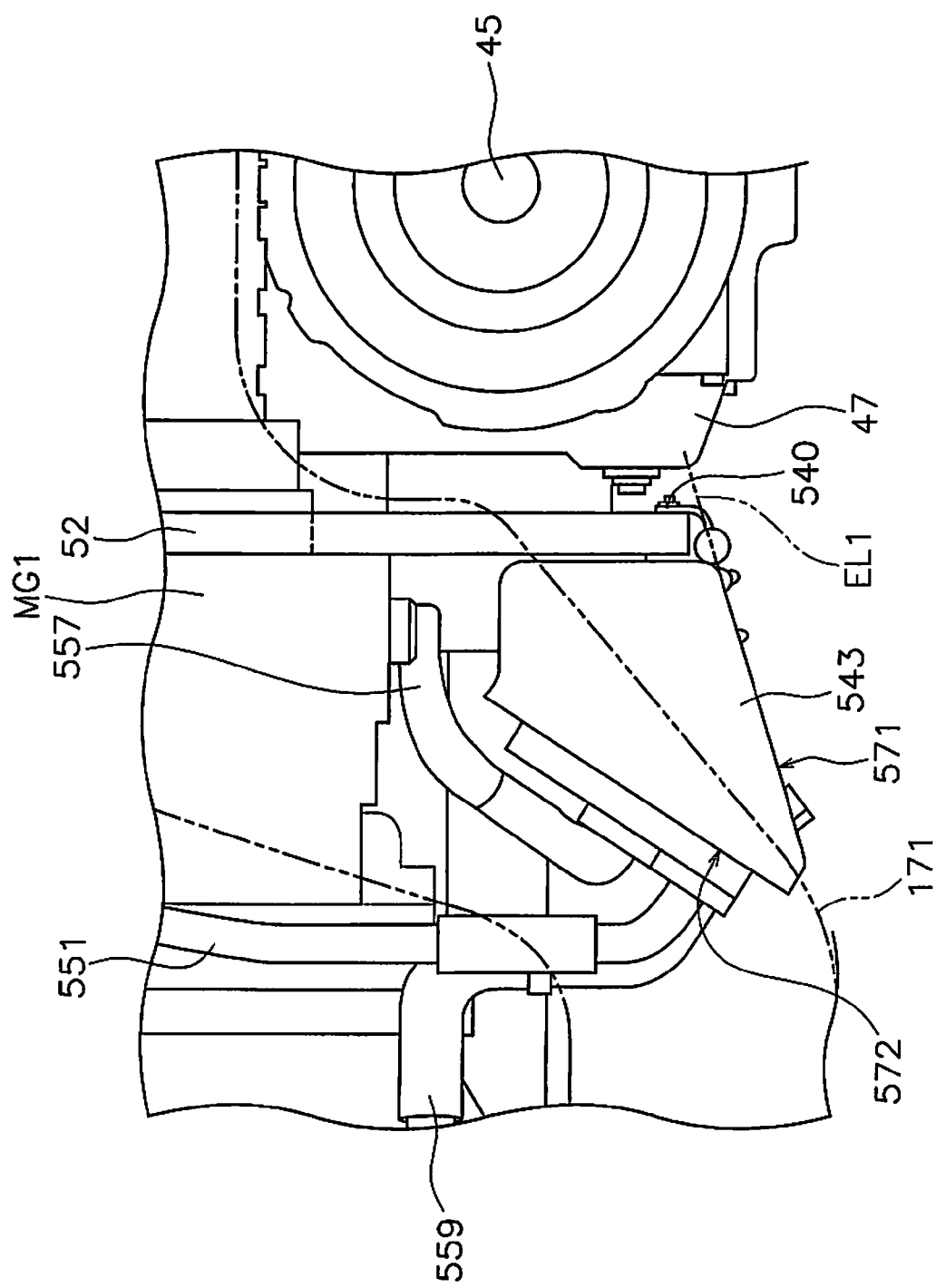
FIG. 14 is an enlarged view of a configuration of the cooling oil tank in FIG. 8 and the vicinity thereof.

FIG. 14 is an enlarged view of a configuration of the cooling oil tank 543 in FIG. 8 and the vicinity thereof. As illustrated in FIG. 14, the cooling oil tank 543 is attached to the mount bracket 52 via a bracket 540. The bottom surface of the cooling oil tank 543 has a first sloped surface 571 that slopes to the rear and upward. A virtual extension line EL1 of the first sloped surface 571 as seen in a side view of the vehicle overlaps the axle housing 47.

The front surface of the cooling oil tank 543 has a second sloped surface 572 that slopes to the front and downward. The cooling oil pipe 544 is connected to the second sloped surface 572. Specifically, the first cooling oil pipe 551, the first drain pipe 557, the second drain pipe 558, and the third drain pipe 559 are connected to the second sloped surface 572. The first drain pipe 557 is arranged so as to not have a portion that extends upward from the first motor MG1 toward the cooling oil tank 543. The second drain pipe 558 is arranged to not have a portion that extends upward from the second motor MG2 toward the cooling oil tank 543. The third drain pipe 559 is arranged to not have a portion that extends upward from the third motor MG3 toward the cooling oil tank 543.

Figure 15:
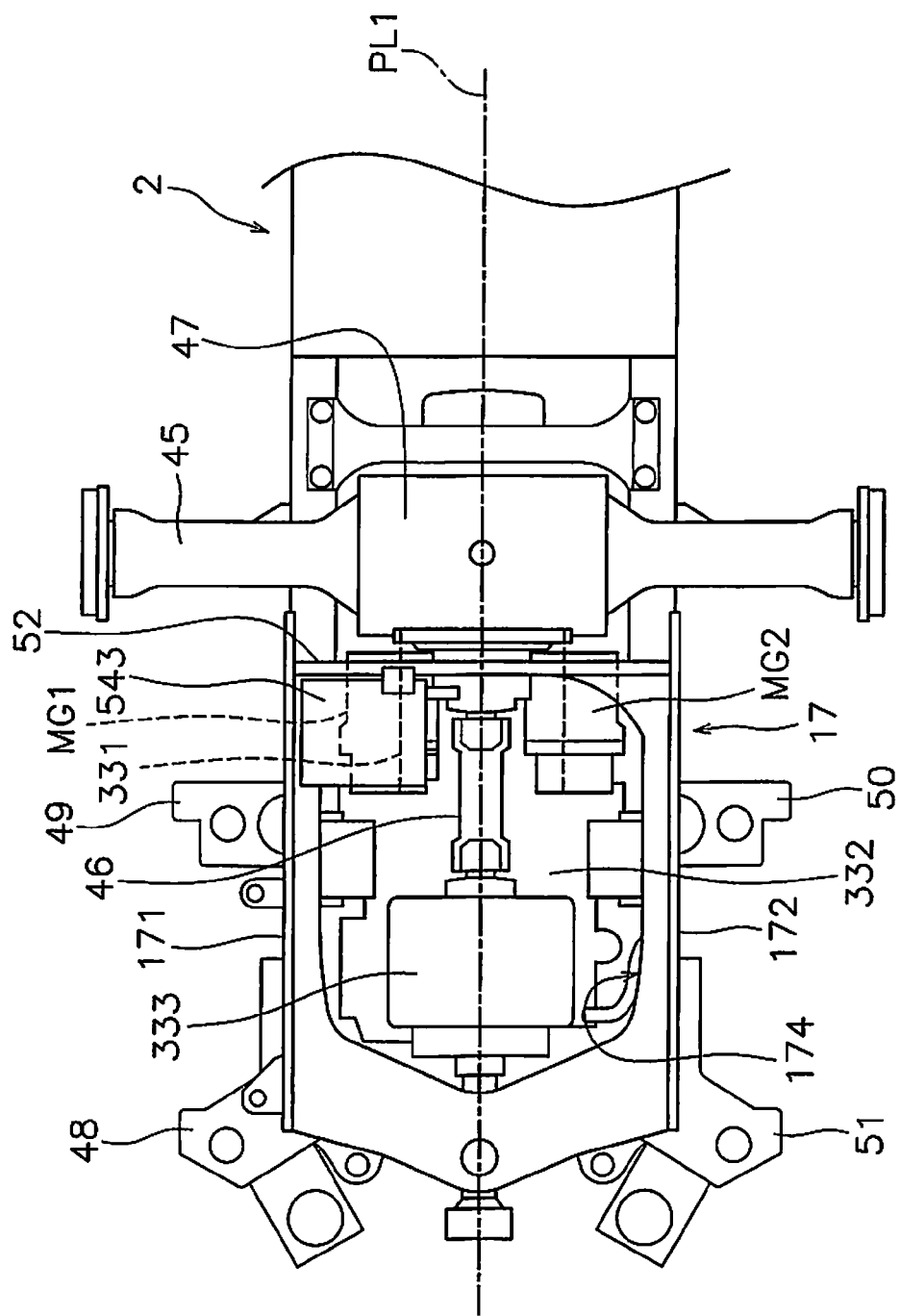
FIG. 15 is a bottom surface view of a portion of the rear part of the wheel loader.

FIG. 15 is a bottom surface view of a portion of the rear part of the wheel loader 1. As illustrated in FIG. 15, the cooling oil tank 543 is arranged between the side surface of the vehicle body frame 2 and the transmission shaft 46 in the vehicle width direction. In the present exemplary embodiment, the cooling oil tank 543 is arranged between the left side part 171 of the vehicle body frame 2 and the transmission shaft 46 in the vehicle width direction.

The first motor MG1, the third motor MG3, and the cooling oil tank 543 are arranged on the same side with regard to the center axis of the transmission 24 that extends in the vehicle front-back direction. That is, the first motor MG1, the third motor MG3, and the cooling oil tank 543 are arranged on the same side with regard to the vertical plane PL1 that includes the center axis Ax1 of the input shaft 61. In the present exemplary embodiment, the first motor MG1, the third motor MG3 and the cooling oil tank 543 are arranged to the left of the vertical plane PL1. A portion of the cooling oil tank 543 overlaps the first motor MG1 as seen from the bottom surface.

The wheel loader 1 according to the present exemplary embodiment has the following characteristics.

Portions of each of the first motor MG1 and the second motor MG2 overlap the input shaft case 331 as seen in a projection view in the up-down direction in the space under the input shaft case 331. As a result, the amounts of protrusion in the vehicle width direction of the first motor MG1 and the second motor MG2 are reduced. Consequently, an increase in the size of the transmission 24 in the vehicle width direction is suppressed. Moreover, the center of gravity of the transmission 24 can be lowered due to the first motor MG1 and the second motor MG2, which are heavy objects, being arranged in low positions.

Portions of each of the first motor MG1 and the second motor MG2 overlap the middle shaft case 332 as seen in the vehicle front-back direction. In this case, the interval in the vehicle width direction between the first motor MG1 and the second motor MG2 can be made even smaller than the width of the middle shaft case 332. Consequently, an increase in the size of the transmission 24 in the vehicle width direction is suppressed.

The rotational axis Ax2 of the first motor MG1 and the rotational axis Ax3 of the second motor MG2 are positioned below the bottom part of the input shaft case 331. In this case, the interval in the vehicle width direction between the first motor MG1 and the second motor MG2 can be made even smaller.

The bottom parts of the first motor MG1 and the second motor MG2 are positioned below the bottom part of the input shaft case 331. In this case, the interval in the vehicle width direction between the first motor MG1 and the second motor MG2 can be made even smaller.

The uppermost parts of the first motor MG1 and the second motor MG2 are positioned above the bottom part of the input shaft case 331. In this case, the position of the first motor MG1 is suppressed from being too low. Consequently, interference with components arranged under the first motor MG1 and the second motor MG2 can be avoided. For example, a space for arranging the cooling oil tank 543 can be secured under the first motor MG1.

The middle shaft 67 is arranged between the first motor MG1 and the second motor MG2 in the vehicle width direction. As a result, the first motor MG1 and the second motor MG2 can be arranged in a space under the input shaft case 331 while avoiding the first motor MG1 and the second motor MG2 from interference with the middle shaft 67.

The protruding part 337, that a portion of the middle shaft 67 is arranged, is arranged between the first motor MG1 and the second motor MG2 in the vehicle width direction. As a result, interference with the protruding part 337 is avoided while allowing the first motor MG1 and the second motor MG2 to be arranged in a space under the input shaft case 331.

The first motor MG1 and the second motor MG2 are arranged obliquely above the transmission shaft 46. As a result, access to the first motor MG1 and the second motor MG2 is facilitated without being hindered by the transmission shaft 46 when carrying out maintenance on the first motor MG1 and the second motor MG2.

The first motor MG1 and the second motor MG2 are arranged by being shifted (offset) in the vehicle front-back direction with respect to the axle housing 47. As a result, the first motor MG1 and the second motor MG2 and the axle housing 47 can be arranged in a compact manner while avoiding the first motor MG1 and the second motor MG2 from interference with the swinging range of the axle housing 47.

The bottom part of the first motor MG1 and the bottom part of the second motor MG2 are arranged below the uppermost part of the axle housing 47. As a result, the first motor MG1, the second motor MG2, and the axle housing 47 can be arranged in a compact manner in the up-down direction.

The first motor MG1 and the second motor MG2 are arranged so as to pass through the recessed part 521 of the mount bracket 52 in the vehicle front-back direction. In this case, the first motor MG1 and the second motor MG2 can be arranged in a low position while avoiding the first motor MG1 and the second motor MG2 from interference with the mount bracket 52.

The bottom surface of the vehicle body frame 2 has the bottom part opening 174 positioned under the first motor MG1 and the second motor MG2. In this case, access to the first motor MG1 and the second motor MG2 from below is facilitated through the bottom part opening 174 and maintenance performance can be improved.

The rotational axis Ax4 of the third motor MG3 is positioned above the rotational axis Ax2 of the first motor MG1 and the rotational axis Ax3 of the second motor MG2. As a result, the third motor MG3 is positioned above the first motor MG1 and the second motor MG2. Consequently, access to the third motor MG3 from above is facilitated and maintenance performance can be improved.

The third motor MG3 is arranged by being shifted in the vehicle front-back direction with respect to the first motor MG1 and the second motor MG2. As a result, the third motor MG3 can be arranged in a compact manner while avoiding the third motor MG3 from interference with the first PTO case 335 and the second PTO case 336 arranged over the first motor MG1 and the second motor MG2.

The end E1 of the rotating shaft Sm1 of the first motor MG1 and the end of the rotating shaft Sm2 of the second motor MG2 are oriented in a direction from the first motor MG1 and the second motor MG2 toward the third motor MG3 in the vehicle front-back direction. An end E3 of the rotating shaft Sm3 of the third motor MG3 is oriented in a direction from the third motor MG3 toward the first motor MG1 and the second motor MG2 in the vehicle front-back direction. As a result, the first motor MG1, the second motor MG2, and the third motor MG3 can be arranged in a compact manner while avoiding the third motor MG3 from interference with the first motor MG1 and the second motor MG2.

The third motor MG3 is positioned under the operating cabin 6. As a result, the third motor MG3 can be easily accessed from above by removing the operating cabin 6 from the vehicle body frame 2. Accordingly, maintenance performance can be improved.

The third motor MG3 is arranged beside the transmission case 33. The clutch control valve 32 is arranged on the front surface of the transmission 24. As a result, the third motor MG3 and the clutch control valve 32 can be arranged in a compact manner.

The first motor MG1 and the second motor MG2 are arranged between the left side part 171 and the right side part 172 of the vehicle body frame 2. Therefore, the interval in the vehicle width direction between the first motor MG1 and the second motor MG2 can be made smaller and an increase in the distance between the left side part 171 and the right side part 172 can be suppressed. As a result, an increase in the interval between the left and right traveling wheels 5 can be suppressed.

The cooling oil tank 543 is positioned below the first motor MG1 and the second motor MG2. As a result, cooling oil can be recovered in the cooling oil tank 543 from the first motor MG1 and the second motor MG2 due to gravity. As a result, the cooling oil can be circulated effectively.

Although an exemplary embodiment of the present invention has been described so far, the present invention is not limited to the above exemplary embodiments and various modifications may be made within the scope of the invention.

The present invention may be applicable to another type of speed change device such as an HMT without being limited to the EMT. In this case, the first motor MG1 functions as a hydraulic motor and a hydraulic pump. The second motor MG2 functions as a hydraulic motor and a hydraulic pump. The third motor MG3 functions as a hydraulic motor and a hydraulic pump. The first motor MG1, the second motor MG2, and the third motor MG3 are variable capacitor pump/motors, and the capacities are controlled by the control unit 31.

The configuration of the transmission 24 is not limited to the configuration of the above exemplary embodiment. For example, the coupling and disposition of the elements of the two planetary gear mechanisms 68 and 69 are not limited to the coupling and disposition of the above exemplary embodiments. The number of planetary gear mechanisms is not limited to two. For example, the transmission may be provided with one planetary gear mechanism. The number of motors is not limited to three. For example, the third motor MG3 may be omitted.

Figure 16:
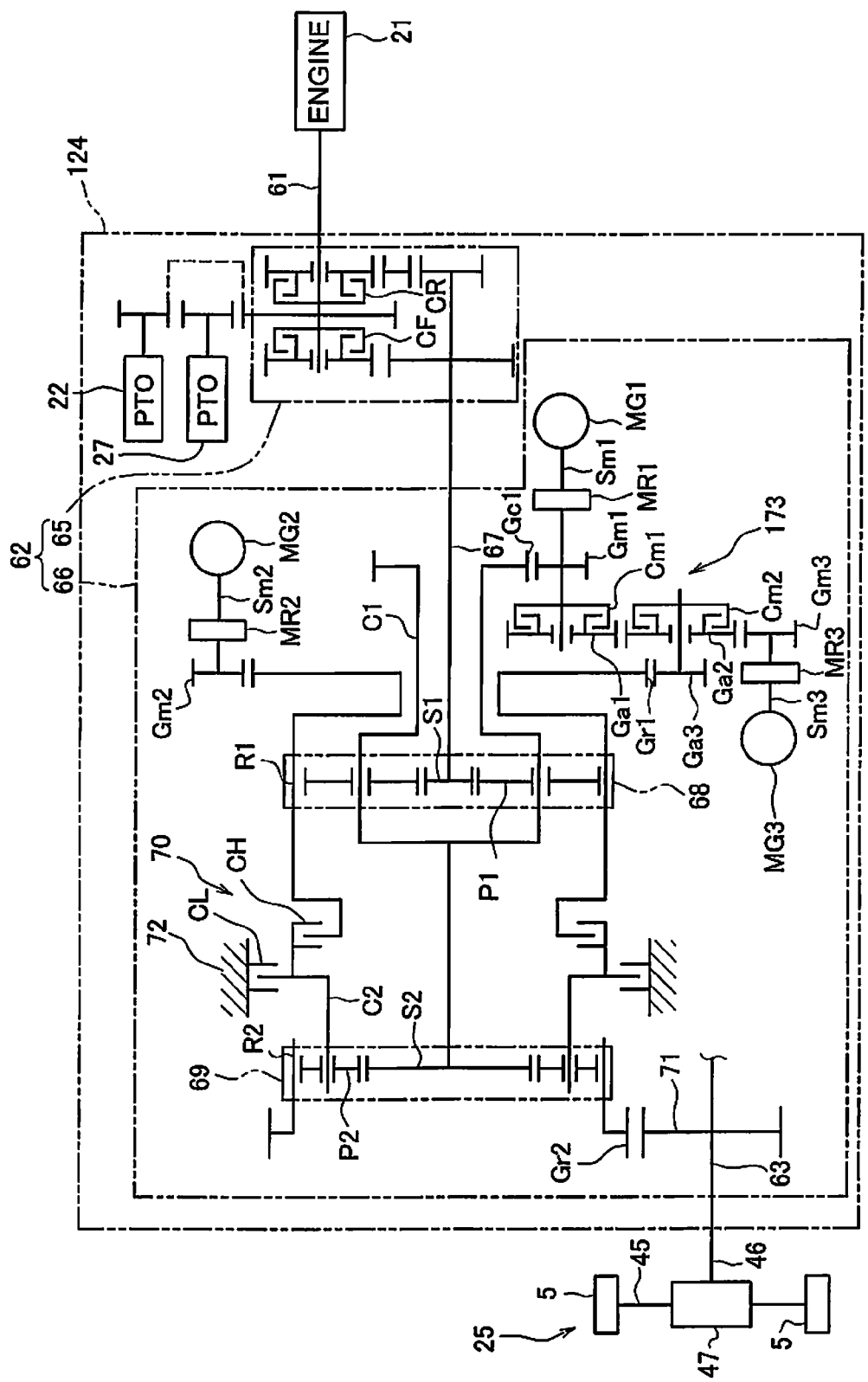
FIG. 16 is a schematic view of a configuration of a transmission according to a modified example.

FIG. 16 is a schematic view of a configuration of a transmission 124 according to a modified example. In the transmission 124 as illustrated in FIG. 16, the forward movement clutch CF and the reverse movement clutch CR are arranged on the same shaft as the input shaft 61. As a result, the input shaft 61 can be arranged closer to the middle shaft 67 in the up-down direction and the size of the transmission 124 can be made smaller. Moreover, a space for arranging the first motor MG1 and the second motor MG2 can be secured under the input shaft 61. As a result, the first motor MG1 and the second motor MG2 can be arranged closer to each other in the vehicle width direction and the interval between the first motor MG1 and the second motor MG2 in the vehicle width direction can be made smaller.

In the transmission 124 according to the modified example, a motor switching mechanism 173 has a third connecting gear Ga3. The third connecting gear Ga3 meshes with the first ring outer periphery gear Gr1. The third connecting gear Ga3 and the second motor gear Gm2 mesh with the first ring outer periphery gear Gr1 to be parallel to each other. The number of teeth of the third connecting gear Ga3 is the same as the number of teeth of the second motor gear Gm2. The first connecting gear Ga1 meshes with the second connecting gear Ga2. The third motor gear Gm3 meshes with the second connecting gear Ga2. The second motor clutch Cm2 switches between connecting and disconnecting the rotating shaft of the third connecting gear Ga3 and the second connecting gear Ga2. Other configurations are the same as those of the transmission 24 according to the above exemplary embodiment.

In the transmission 124 according to the modified example, the third motor gear Gm3 assists the first motor MG1 while the first motor clutch Cm1 is connected and the second motor clutch Cm2 is disconnected in the same way as the transmission 24 of the above exemplary embodiment. While the second motor clutch Cm2 is connected and the first motor clutch Cm1 is disconnected, the third motor gear Gm3 assists the second motor MG2.

Moreover, the second motor gear Gm2 meshes with the first ring outer periphery gear Gr1 parallel to the third connecting gear Ga3 in the transmission 124 according to the modified example. Therefore, the second motor MG2 can be arranged regardless of the position of the third connecting gear Ga3. As a result, freedom to arrange the second motor MG2 can be improved.

MR1 is a speed reduction gear connected to the first motor MG1, MR2 is a speed reduction gear connected to the second motor MG2, and MR3 is a speed reduction gear connected to the third motor MG3 in FIG. 16. The speed reduction gears MR1, MR2, and MR3 may be omitted. Alternatively, the speed reduction gears MR1, MR2, and MR3 may be provided in the above exemplary embodiment.

The entirety of the first motor MG1 and the second motor MG2 may overlap the input shaft case 331 as seen in a projection view in the up-down direction. The entirety of the first motor MG1 and the second motor MG2 may overlap the middle shaft case 332 as seen in the vehicle front-back direction.

The shape of the input shaft case 331 is not limited to a cylindrical shape. So long as at least the lower part of the input shaft case 331 has the curved surface part 334 that is curved so as to protrude downward, the upper part of the input shaft case 331 may have a linear shape.

The locations of the first to third motors MG1 to MG3 are not limited to the positions of the above exemplary embodiment and may be changed. The shape of the transmission case 33 is not limited to the position of the above exemplary embodiment and may be changed. For example, the positions of the first to third motors MG1 to MG3 and/or the shape of the transmission case 33 may be reverse in the front-back direction to the respective positions and shape in the above exemplary embodiment. Alternatively, the positions of the first to third motors MG1 to MG3 and/or the shape of the transmission case 33 may be reverse in the left-right direction to the respective positions and shape in the above exemplary embodiment.

The clutch control valve 32 may be arranged in a location other than the front surface of the transmission 24. For example, the clutch control valve 32 may be arranged on the rear surface of the transmission 24.

The shape of the mount bracket 52 is not limited to the shape described in the above exemplary embodiment. For example, the shape of the recessed part 521 in the mount bracket 52 may be changed. Alternatively, the recessed part 521 may be omitted.

The shape of the vehicle body frame 2 is not limited to the shape in the above exemplary embodiment. For example, the bottom part opening 174 may be omitted. Alternatively, the side part opening 173 may be omitted.

The position of the cooling oil tank 543 is not limited to the position of the above exemplary embodiment. For example, the cooling oil tank 543 may be arranged under the second motor MG2. Alternatively, the cooling oil tank 543 may be arranged in a location other than below the transmission 24. The shape of the cooling oil tank 543 is not limited to the shape in the above exemplary embodiment. For example, the first sloped surface 571 may be omitted. Alternatively, the second sloped surface 572 may be omitted. Alternatively, the cooling oil tank 543 may have a rectangular solid shape, a cubic shape, or a cylindrical shape.

According to exemplary embodiments of the present invention, an increase in the size of the transmission in the vehicle width direction in a hybrid-type wheel loader can be suppressed.

What is claimed is:

1. A wheel loader comprising:
an engine;
a travel device driven by the engine;
a transmission that transmits driving power from the engine to the travel device; and
a vehicle body frame that supports the transmission;
the transmission including
an input shaft extending in a vehicle longitudinal direction;
an output shaft extending in the vehicle longitudinal direction;
a gear mechanism that transmits rotation of the input shaft to the output shaft, the gear mechanism including a middle shaft arranged under the input shaft and extending in the vehicle longitudinal direction and a planetary gear mechanism connected to the middle shaft;
a transmission case that houses the input shaft, the gear mechanism, and the output shaft;
a first motor connected to a first rotating element of the planetary gear mechanism, the first motor being attached to the transmission case; and
a second motor connected to a second rotating element of the planetary gear mechanism, the second motor being attached to the transmission case;
the transmission being configured so that a rotation speed ratio of the output shaft with respect to the input shaft is changed by changing the rotation speeds of the first motor and the second motor;
the transmission case having an input shaft case for housing the input shaft;

a lower part of the input shaft case including a curved surface part that is curved to protrude downward;
the first motor and the second motor being arranged below the input shaft; and
at least a portion of the first motor and the second motor overlapping the curved surface part as seen in a projection view in a vehicle vertical direction, the vehicle vertical direction being perpendicular to the vehicle longitudinal direction and corresponding to a vertical direction of the wheel loader when the wheel loader rests on a level surface.

2. The wheel loader according to claim 1, wherein
the transmission case further has a middle shaft case for housing the gear mechanism;
the middle shaft case is arranged in line with the input shaft case in the vehicle longitudinal direction;
a bottom part of the middle shaft case is positioned below a bottom part of the input shaft case; and
at least a portion of the first motor and the second motor overlaps the middle shaft case as seen in the vehicle longitudinal direction.

3. The wheel loader according to claim 1, wherein
a rotational axis of the first motor is positioned below the bottom part of the input shaft case.

4. The wheel loader according to claim 1, wherein
a rotational axis of the second motor is positioned below the bottom part of the input shaft case.

5. The wheel loader according to claim 1, wherein
a bottom part of the first motor is positioned below the bottom part of the input shaft case.

6. The wheel loader according to claim 1, wherein
a bottom part of the second motor is positioned below the bottom part of the input shaft case.

7. The wheel loader according to claim 1, wherein
an uppermost part of the first motor is positioned above the bottom part of the input shaft case.

8. The wheel loader according to claim 1, wherein
an uppermost part of the second motor is positioned above the bottom part of the input shaft case.

9. The wheel loader according to claim 1, wherein
the first motor and the second motor are arranged spaced apart from each other in a vehicle width direction, the vehicle width direction being perpendicular to the vehicle longitudinal direction and the vehicle vertical direction and corresponding to a direction spanning between a left side and a right side of the vehicle body; and
the middle shaft is arranged between the first motor and the second motor.

10. The wheel loader according to claim 9, wherein
the transmission case further has a protruding part that protrudes downward from the bottom part of the input shaft case;
a portion of the middle shaft is arranged inside the protruding part; and
the protruding part is arranged between the first motor and the second motor.

11. A wheel loader according to claim 1, wherein
a bottom surface of the vehicle body frame has an opening positioned under the transmission.

12. The wheel loader according to claim 1, wherein
the vehicle body frame has a left side part and a right side part; and
the first motor and the second motor are arranged between the left side part and the right side part.

13. The wheel loader according to claim 1, further comprising
a cooling oil tank for storing cooling oil for cooling the first motor and the second motor; and
the cooling oil tank is positioned below the first motor and the second motor.

14. The wheel loader according to claim 1, wherein
the travel device has an axle shaft that extends in the vehicle width direction, and a transmission shaft that transmits driving power from the transmission to the axle shaft;
at least a portion of the transmission shaft is arranged under the transmission and extends in the vehicle longitudinal direction; and
the first motor and the second motor are arranged obliquely above the transmission shaft as seen in an axial direction of the transmission shaft.

15. The wheel loader according to claim 14, wherein
the travel device further has an axle housing for housing the axle shaft;
the axle housing is pivotably supported with respect to the vehicle body frame; and
the first motor and the second motor are arranged by being offset with respect to the axle housing in the vehicle longitudinal direction.

16. The wheel loader according to claim 15, wherein
the bottom part of the first motor is arranged below an uppermost part of the axle housing.

17. The wheel loader according to claim 15, wherein
the bottom part of the second motor is arranged below an uppermost part of the axle housing.

18. The wheel loader according to claim 15, wherein
the vehicle body frame further has a mount bracket that pivotably supports the axle housing;
an upper surface of the mount bracket includes a recessed part that is recessed downwards in the vehicle vertical direction; and
the first motor and the second motor are arranged to pass through the recessed part in the vehicle longitudinal direction.

19. The wheel loader according to claim 1, wherein
the transmission further has a third motor for assisting the first motor or the second motor; and
a rotational axis of the third motor is arranged above a rotational axis of the first motor and a rotational axis of the second motor.

20. The wheel loader according to claim 19, wherein
the transmission further has a first power take-off mechanism connected to the input shaft and a second power take-off mechanism connected to the input shaft;
the first power take-off mechanism and the second power take-off mechanism are arranged over the first motor and the second motor; and
the third motor is offset in the vehicle longitudinal direction with respect to the first motor or the second motor.

21. The wheel loader according to claim 20, wherein
an end of a rotating shaft of the first motor and an end of a rotating shaft of the second motor are oriented in a direction from the first motor and the second motor toward the third motor in the vehicle longitudinal direction; and
an end of a rotating shaft of the third motor is oriented in a direction from the third motor toward the first motor and the second motor in the vehicle longitudinal direction.

22. The wheel loader according to claim 19, further comprising
an operating cabin attached to the vehicle body frame in a detachable manner, the third motor being positioned under the operating cabin.

23. The wheel loader according to claim 19, wherein
the third motor is arranged beside the transmission case;
the transmission further includes
a hydraulic clutch for switching a power transmission path in the transmission;
a clutch control valve for controlling hydraulic fluid supplied to the hydraulic clutch; and
the clutch control valve being arranged on a front surface or a rear surface of the transmission.

* * * * *